(12) United States Patent
Townsend et al.

(10) Patent No.: US 8,950,200 B2
(45) Date of Patent: Feb. 10, 2015

(54) EVAPORATIVE CONDENSER COOLING UNIT AND METHOD

(75) Inventors: Donald I. Townsend, Phoenix, AZ (US); Lawrence R. Chavez, Gilbert, AZ (US); Gary Stephen Jouas, Phoenix, AZ (US)

(73) Assignee: Phoenix Manufacturing, Inc., Phoenix, AZ (US)

( * ) Notice: Subject to any disclaimer, the term of this patent is extended or adjusted under 35 U.S.C. 154(b) by 190 days.

(21) Appl. No.: 13/592,981

(22) Filed: Aug. 23, 2012

(65) Prior Publication Data

US 2013/0047641 A1    Feb. 28, 2013

Related U.S. Application Data

(60) Provisional application No. 61/526,550, filed on Aug. 23, 2011.

(51) Int. Cl.
| | | |
|---|---|---|
| F25D 17/06 | (2006.01) | |
| F25B 39/04 | (2006.01) | |
| F28B 5/00 | (2006.01) | |
| F28B 11/00 | (2006.01) | |
| F24F 1/14 | (2011.01) | |
| F24F 5/00 | (2006.01) | |
| F28D 5/00 | (2006.01) | |
| F24F 1/42 | (2011.01) | |

(52) U.S. Cl.
CPC . *F25B 39/04* (2013.01); *F28B 5/00* (2013.01); *F28B 11/00* (2013.01); *F24F 1/14* (2013.01); *F24F 5/0035* (2013.01); *F28D 5/00* (2013.01); *F25B 2339/041* (2013.01); *F24F 1/42* (2013.01); *Y02B 30/545* (2013.01); *F28F 2275/085* (2013.01)

USPC .................................................. 62/92; 62/305

(58) Field of Classification Search
CPC .... F25B 39/04; F25B 2339/041; F25B 11/00; F25B 5/00; F25B 5/0035; F25B 1/42; Y02B 30/545
USPC ...................... 62/92, 305, 89, 259.4
See application file for complete search history.

(56) References Cited

U.S. PATENT DOCUMENTS

| | | | | |
|---|---|---|---|---|
| 2,818,793 A * | 1/1958 | Hord | ............................. | 454/203 |
| 2,864,359 A * | 12/1958 | Vaughn | ..................... | 126/110 B |
| 3,687,325 A * | 8/1972 | Simons | ........................ | 220/4.33 |
| 3,913,345 A * | 10/1975 | Goettl | ............................. | 62/183 |
| 4,107,942 A * | 8/1978 | Fairman | ......................... | 62/305 |
| 4,142,603 A * | 3/1979 | Johnson | ........................ | 181/148 |
| 4,579,694 A * | 4/1986 | Bradley, Jr. | ................ | 261/112.2 |
| 4,815,297 A * | 3/1989 | Kelley | .............................. | 62/91 |
| 5,724,828 A * | 3/1998 | Korenic | ......................... | 62/305 |
| 5,816,318 A * | 10/1998 | Carter | ............................ | 165/110 |
| 6,070,860 A * | 6/2000 | Kinney et al. | .................... | 261/30 |
| 6,432,367 B1 * | 8/2002 | Munk | ............................ | 422/171 |
| 6,598,862 B2 * | 7/2003 | Merrill et al. | ................. | 261/128 |

(Continued)

*Primary Examiner* — Mohammad M Ali
(74) *Attorney, Agent, or Firm* — Schiff Hardin LLP

(57) ABSTRACT

An evaporative cooled condenser unit employs a quiet motor/fan system that pulls air across an evaporative media pad, through a drift eliminator and delivers cool air to a condensing unit of an air conditioner thereby increasing the operating efficiency of the air conditioner. A condenser enclosure into which the cool air is delivered is adjustable for various sizes of condenser units and contains a plurality of barometric dampers to provide failsafe operation and provide for external air flow to the condenser during heat pump operation or when the auxiliary cooling module is disabled.

20 Claims, 28 Drawing Sheets

(56) References Cited

U.S. PATENT DOCUMENTS

| | | | |
|---|---|---|---|
| 6,766,655 B1* | 7/2004 | Wu | 62/305 |
| 6,966,350 B1* | 11/2005 | Gist | 144/285 |
| 7,128,310 B2* | 10/2006 | Mockry et al. | 261/112.1 |
| 7,263,852 B2* | 9/2007 | Bacchus | 62/305 |
| 7,470,176 B2* | 12/2008 | Morris et al. | 454/61 |
| 7,603,774 B2* | 10/2009 | Facius et al. | 29/890.03 |
| 7,765,827 B2* | 8/2010 | Schlom et al. | 62/309 |
| 8,104,920 B2* | 1/2012 | Dubord | 362/217.12 |
| 2002/0195729 A1* | 12/2002 | Merrill et al. | 261/128 |
| 2004/0155370 A1* | 8/2004 | Kinney et al. | 261/110 |
| 2005/0193606 A1* | 9/2005 | Stangl et al. | 40/606.08 |
| 2007/0217139 A1* | 9/2007 | Lin | 361/683 |
| 2008/0053116 A1* | 3/2008 | Reyzin et al. | 62/121 |
| 2009/0188650 A1* | 7/2009 | Morgan et al. | 165/104.21 |
| 2009/0272279 A1* | 11/2009 | Kieck | 99/468 |

* cited by examiner

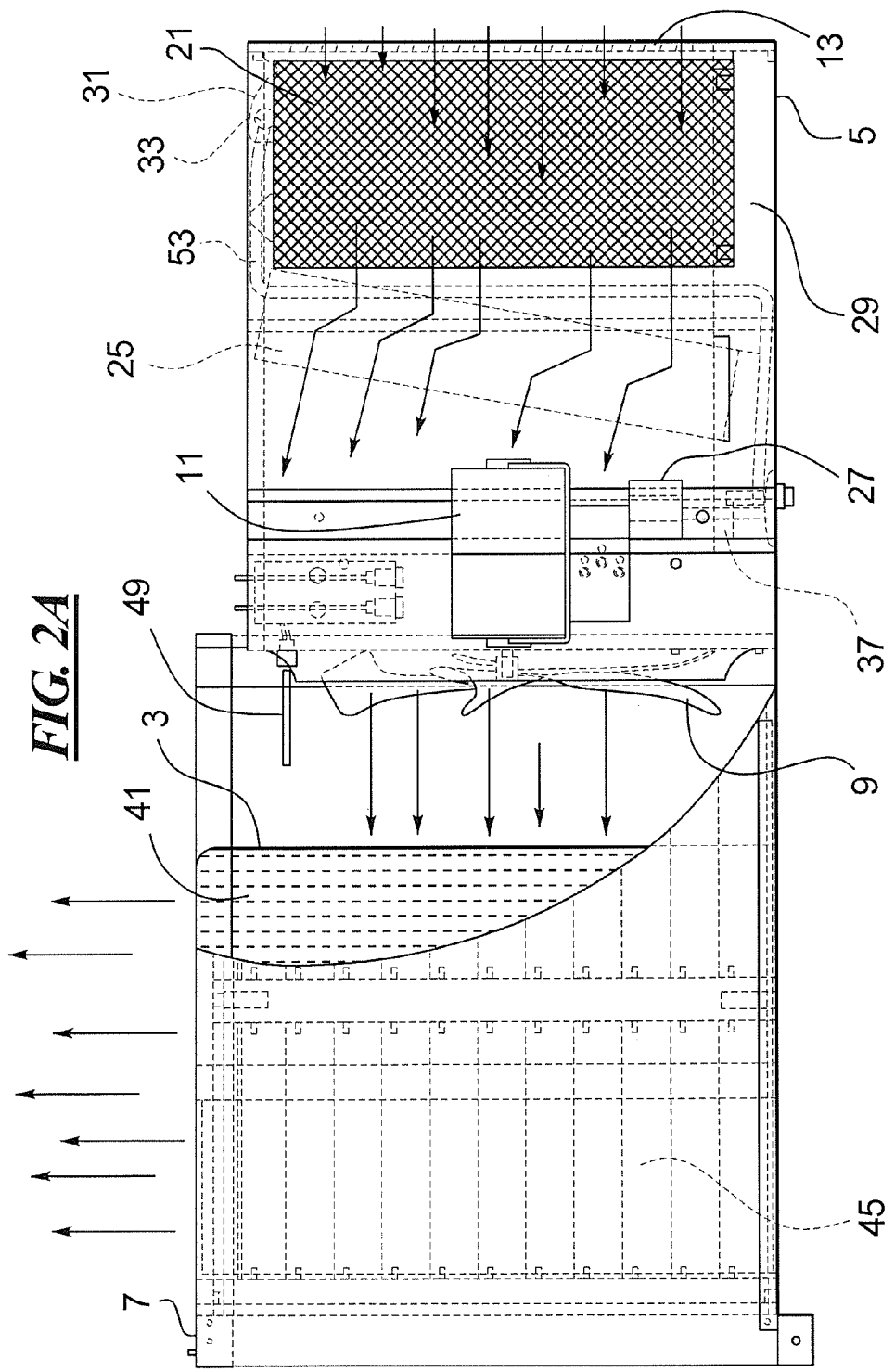

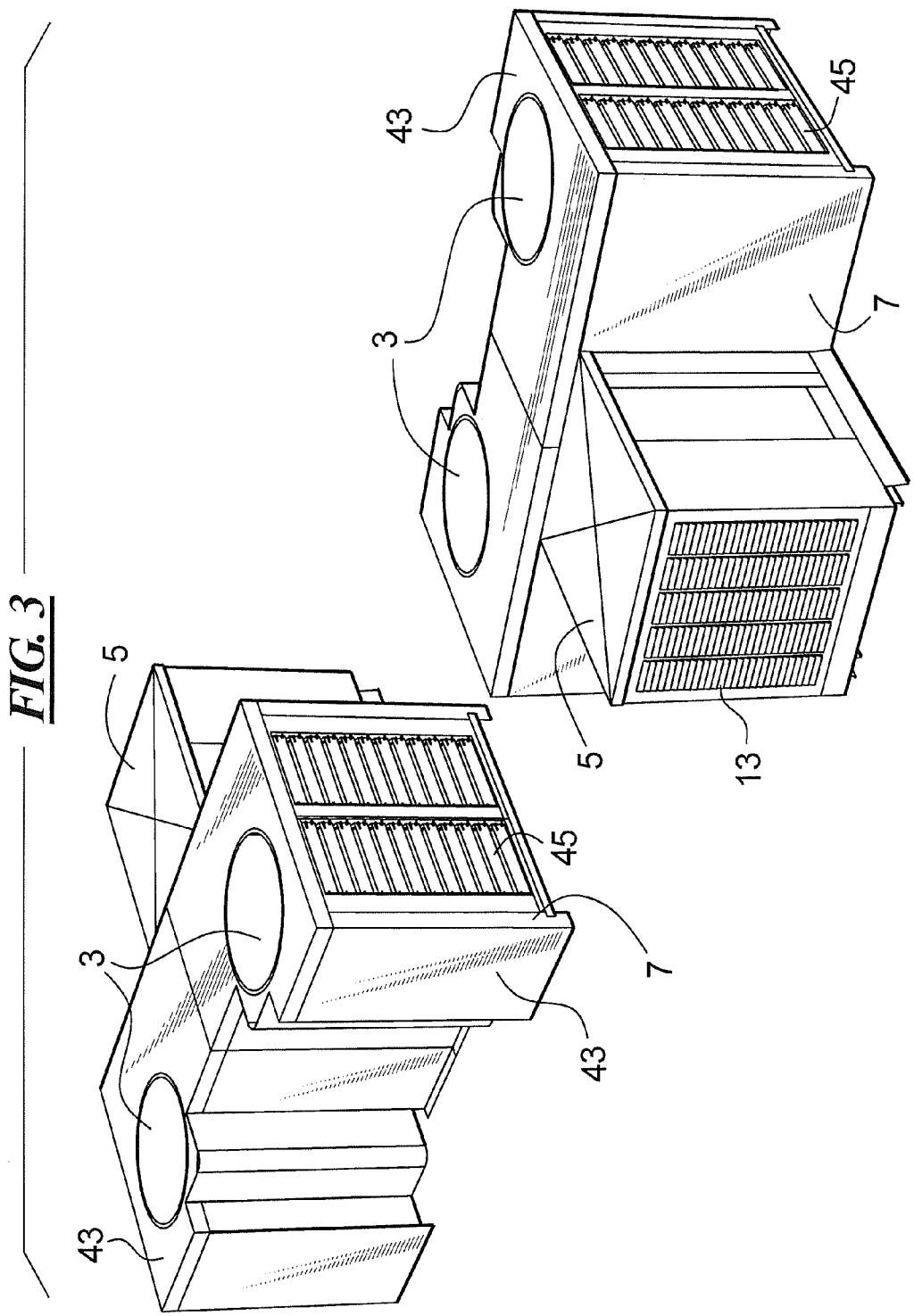

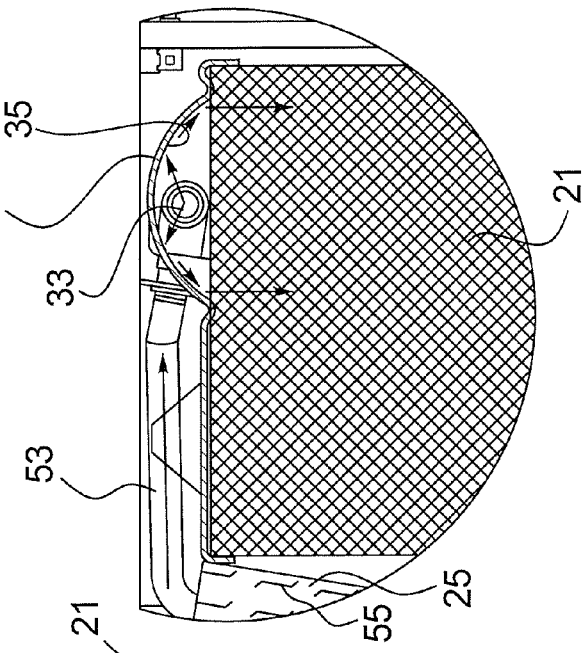
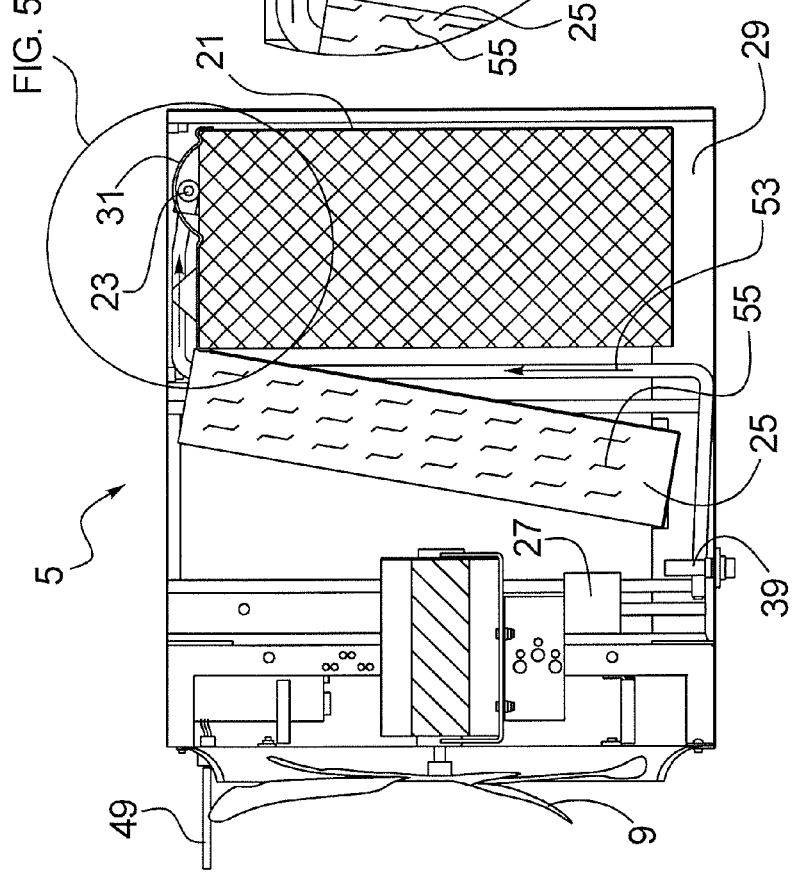
*FIG. 5A*
*FIG. 5B*

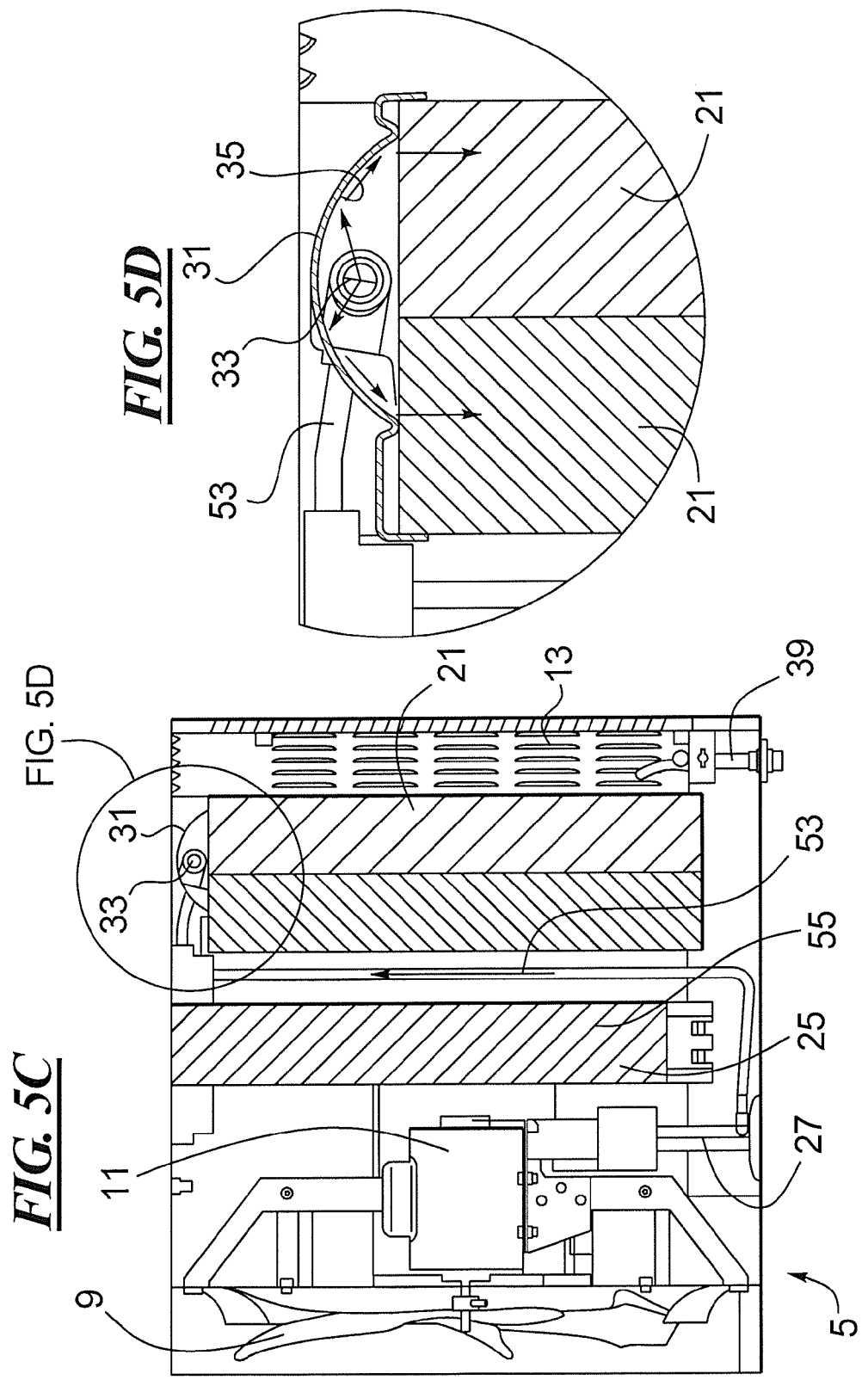

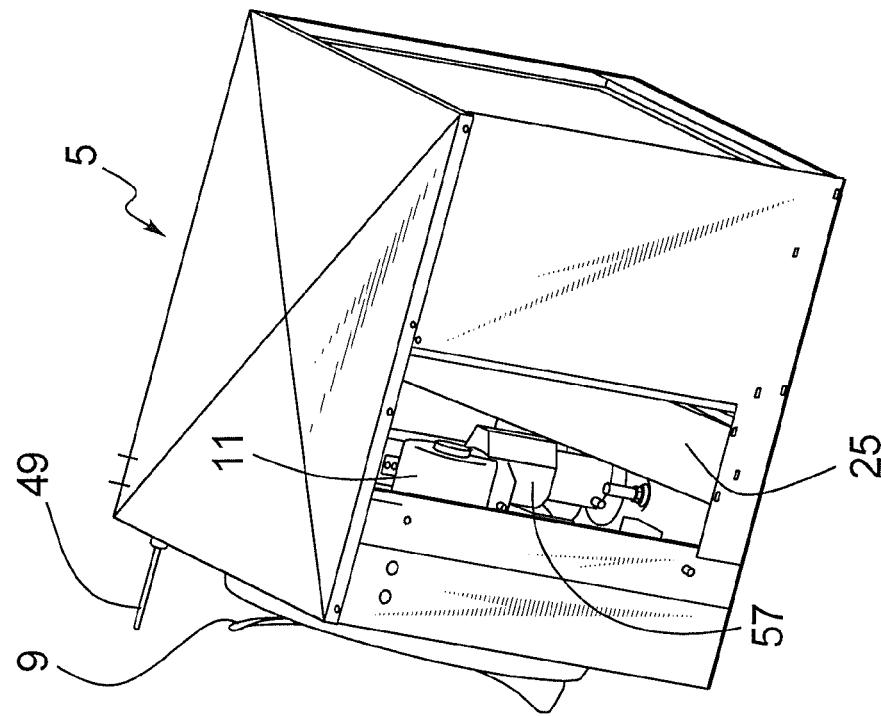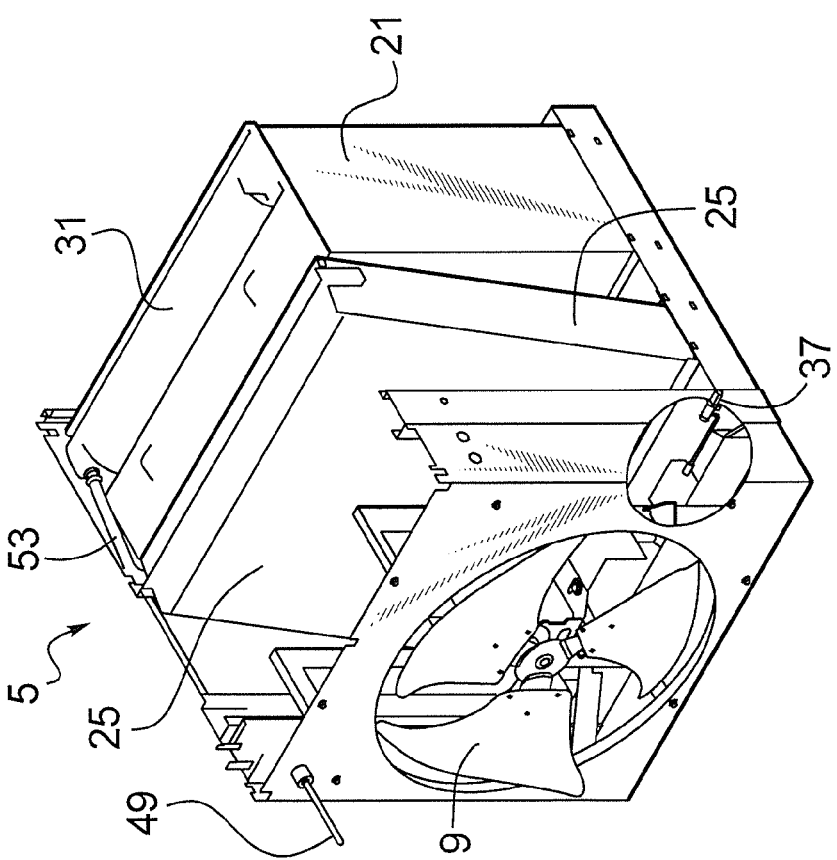

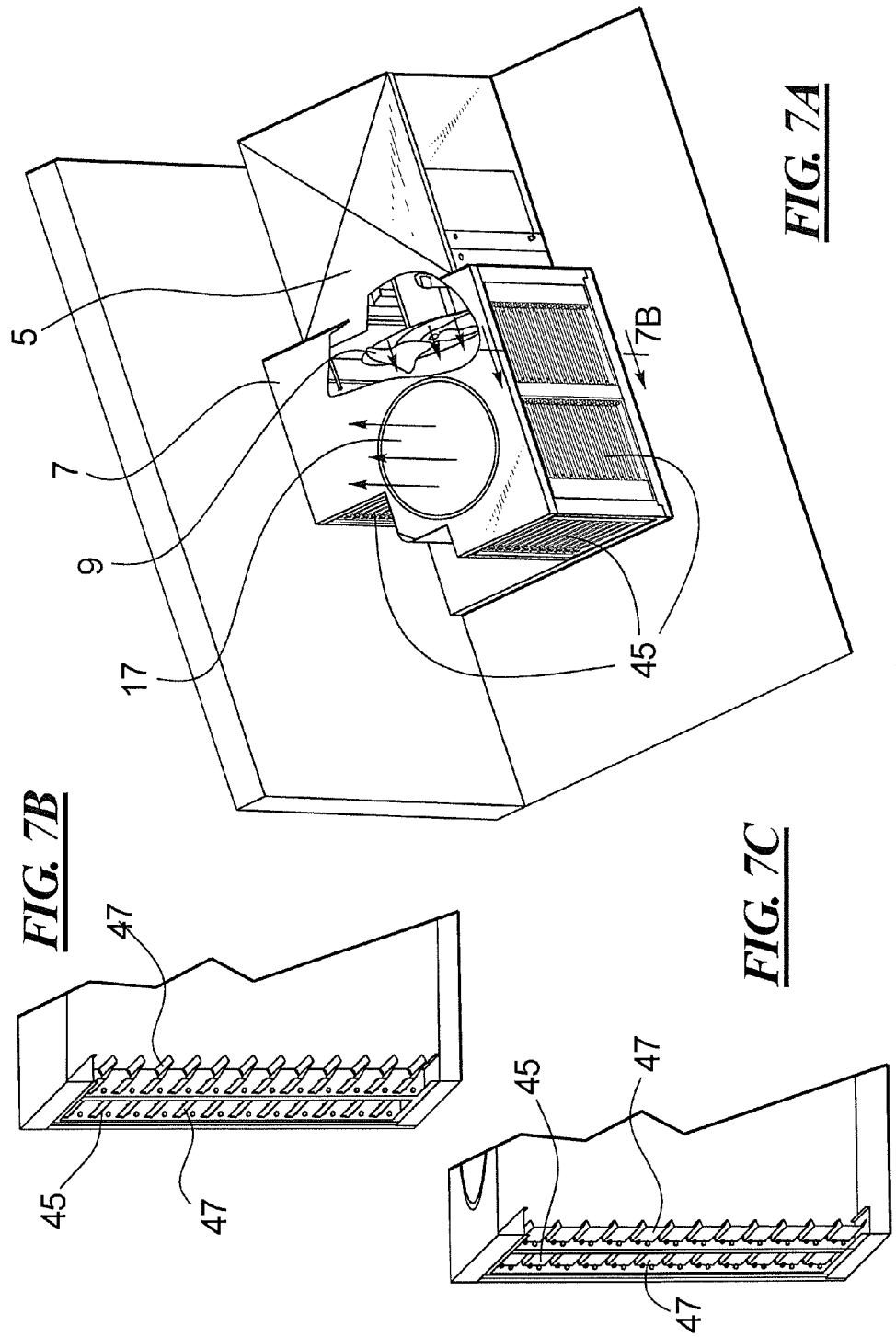

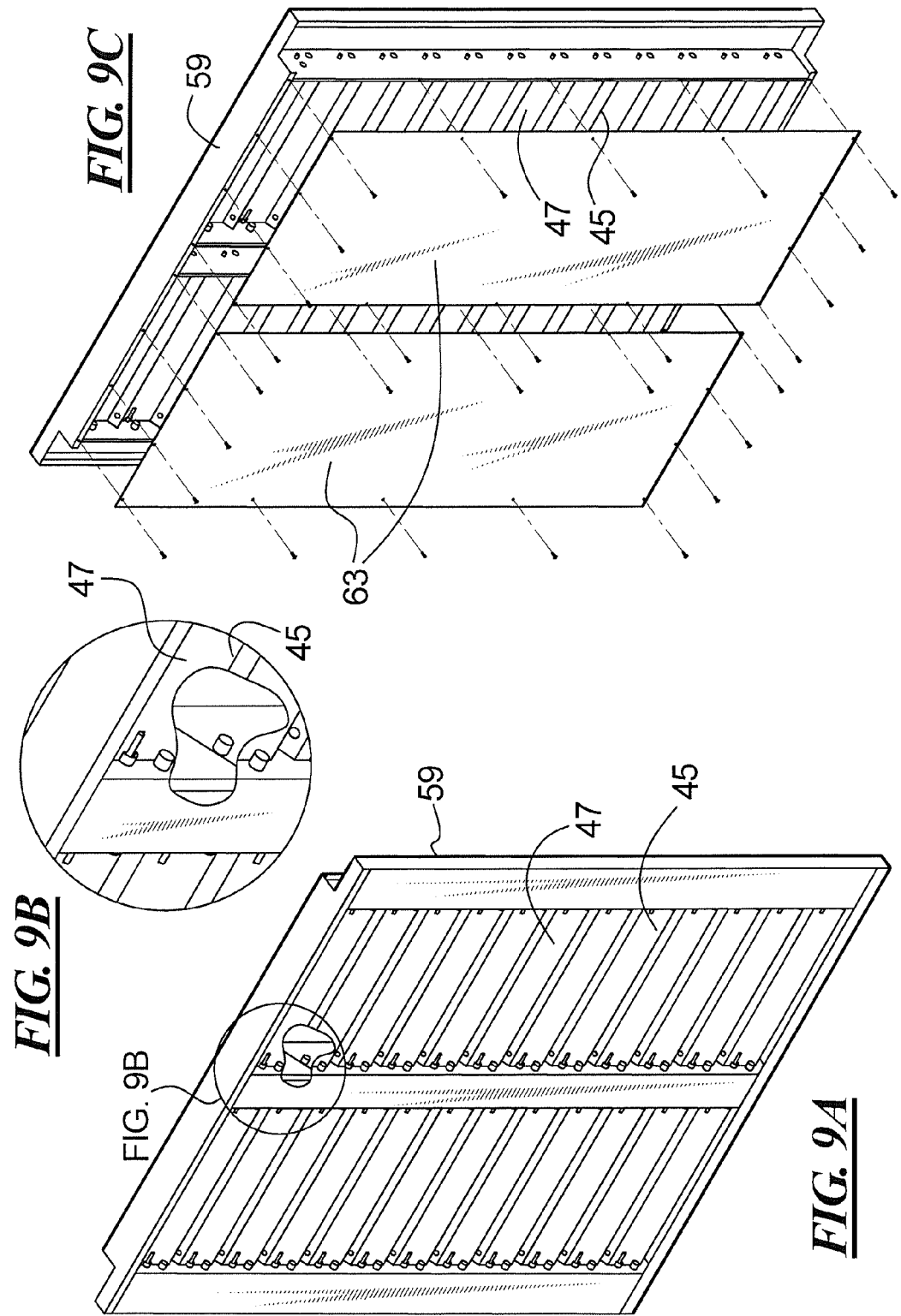

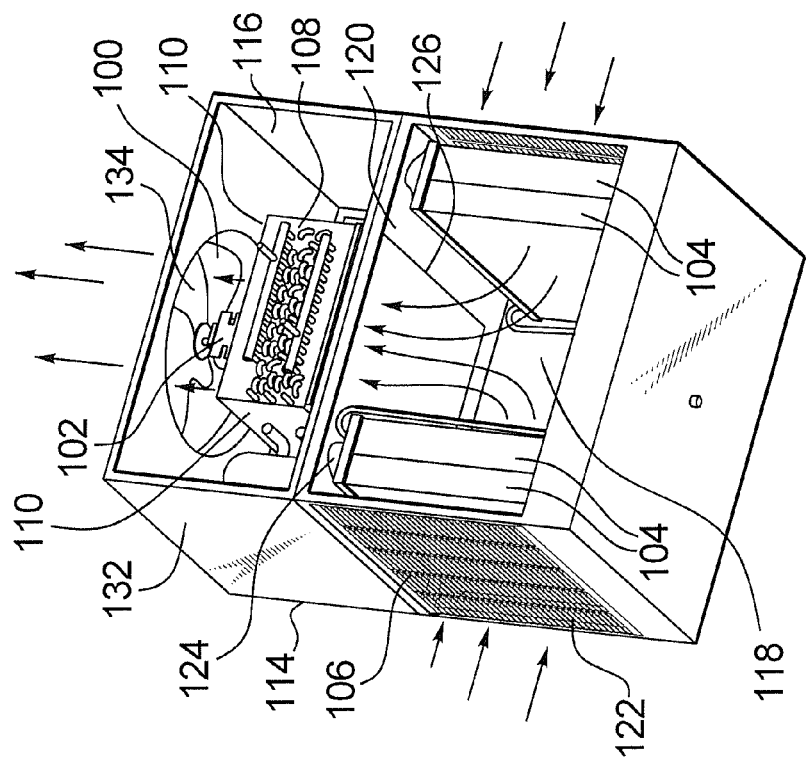
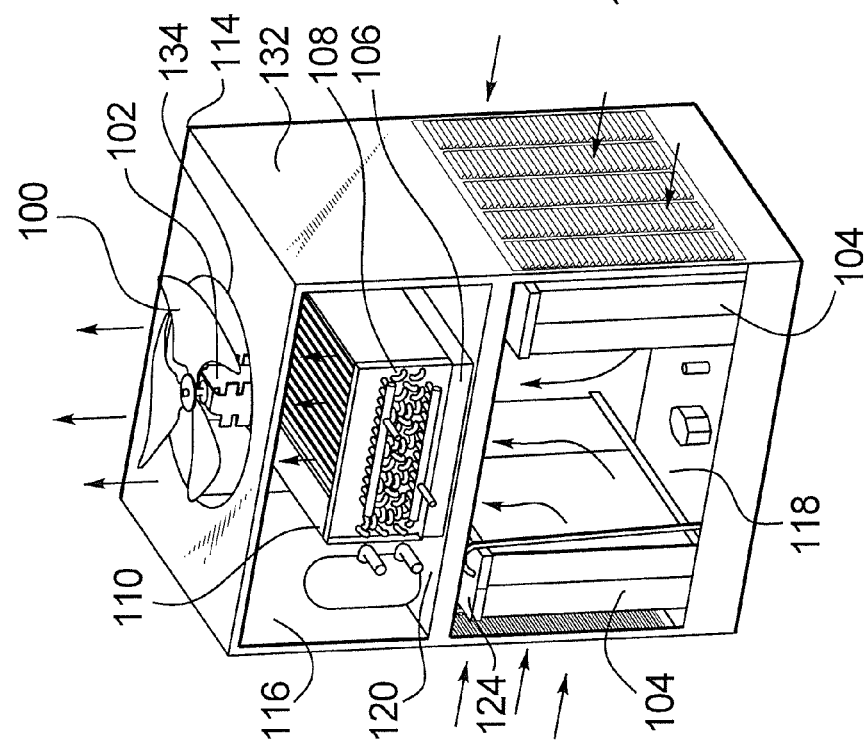
FIG. 11A
FIG. 11B

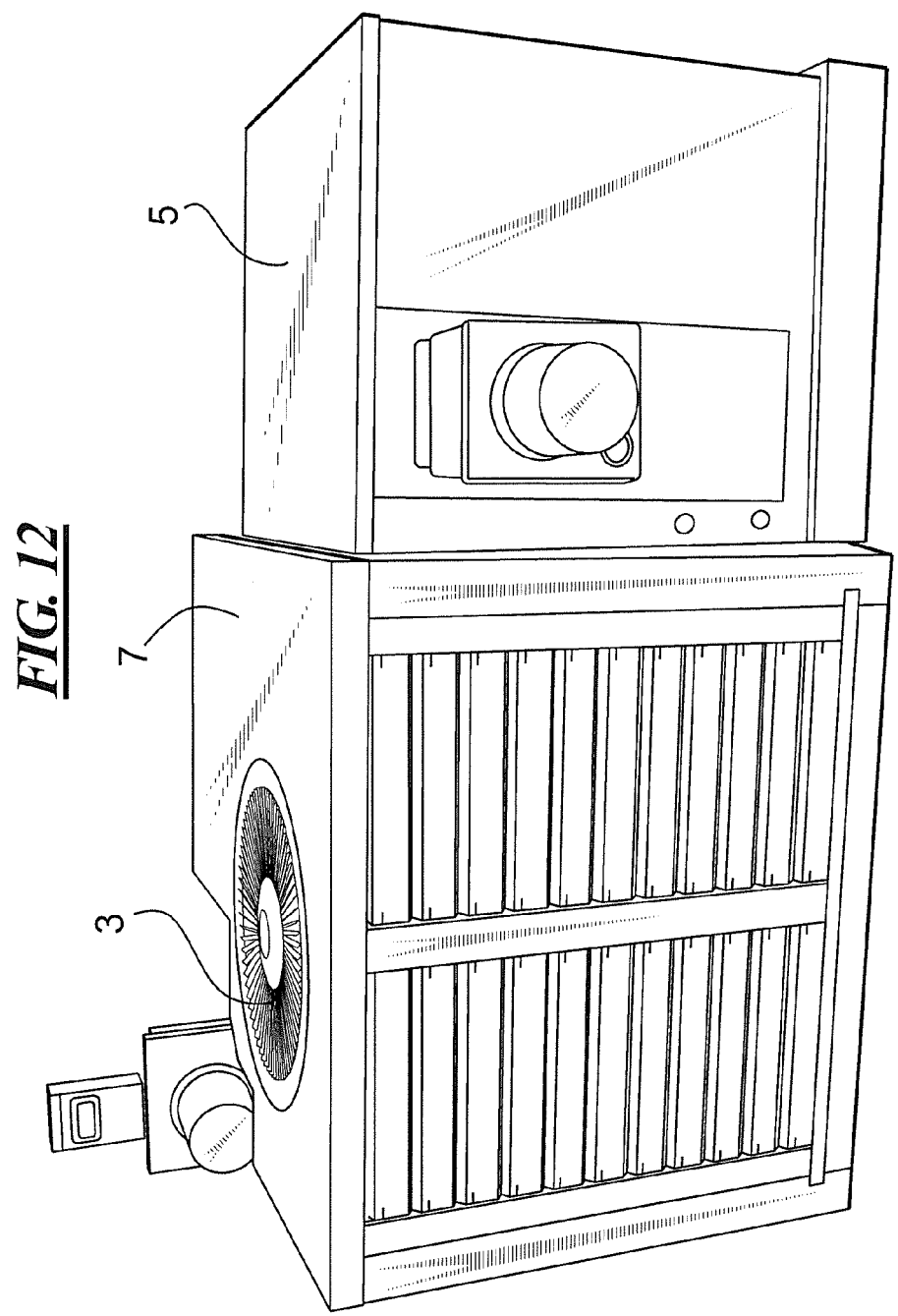

EVAPORATIVE CONDENSER COOLING UNIT AND METHOD

CROSS-REFERENCE TO RELATED APPLICATION

This application claims priority to U.S. Provisional Application Ser. No. 61/526,550 filed Aug. 23, 2011, the entire disclosure of which is hereby incorporated by reference herein.

BACKGROUND OF THE INVENTION

1. Field of the Invention

The present invention relates generally to an air conditioner system and method, and more particularly to a system and method that includes an air cooler to provide cooled air to a condenser of an air conditioner system.

2. Description of the Related Art

Air conditioner systems for cooling interior spaces such as interiors of homes, offices, stores, or other buildings that use a forced air HVAC system operate by cycling the air conditioner on and off to regulate the interior temperature to the desired level. When the air conditioner is on, it draws power. The more time that the air conditioner is on during the cycle, the greater the amount of power required to operate the air conditioner. As the difference between the outside temperature and the desired inside temperature becomes greater, the air conditioner runs for a greater percentage of the cycle time, requiring more power to cool to the desired level.

Air conditioner systems typically include a condenser into which outside air is drawn where the air is heated by a condenser coil in the heat exchange process between the inside air and the outside air. A cooling coil is provided over which interior air is forced to cool the interior air. The coils are filled with a coolant such as Freon and are connected to one another via a compressor at one side and an expansion valve at the other side, as is well known. A significant amount of power is required by air conditioner systems, particularly when the outside air temperatures rise so that hotter air is being drawn into the condenser. The hotter air causes the air conditioner to operate less efficiently.

Attempts have been made at pre-cooling the air provided to the condenser coil of an air conditioner system. One such system involves evaporative cooling wherein the air is drawn over a wet medium so that the evaporating water cools the air before it is supplied to the condenser coil. However, water droplets become entrained in the air flow and reach the condenser coil where the water in conjunction with dust and chemicals in the air cause rust and corrosion of the condenser coil in a relatively short time.

SUMMARY OF THE INVENTION

The present invention provides an air conditioning system that includes an evaporative cooling unit that provides cool air to the condenser unit of an air conditioning system. The Evaporative Condenser Cooling Unit (ECCU) comprises two basic assemblies, (a) a cooling module which includes a fan, a motor, evaporative media, a drift eliminator, a water sump, a pump, a water distributor, and electrical controls and (b) a condenser enclosure which includes an enclosure housing around the condenser of the air conditioner system and adjustable distribution panels that channel the air from the cooling module to the condenser inlets. The cooling module may be connected to a water supply. The evaporative cooling module pulls outside air through the evaporative media which has been wet by the water being provided to it by the water distributor. The air from the evaporative media then travels through the drift eliminator that removes water droplets from the air flow. From the drift eliminator the cooled air is delivered to the condenser enclosure. The condenser enclosure may include a plurality of barometric dampers that are closed during operation of the evaporative condenser cooling unit but which open when the evaporative condenser cooling unit is off, for example in the event of an ECCU failure or when the ECCU is disabled, as described below. The closed barometric dampers ensure that the cooled air is provided to the condenser coil but when the dampers are open they permit ample outside air to enter the condenser unit during operation of the air conditioner. When the dampers are open, the condenser unit operates in heat pump mode with the evaporative cooling module in a non-operating condition.

A main objective for using the evaporative condenser cooling unit on an air conditioner is so that the air condition system consumes less electricity and reduces the peak demand on utility companies as well as reduces end user's utility bills. In one example, an air conditioner system that has the evaporative condenser cooling unit reduces electrical usage by up to 25% compared to the air condition system without the evaporative condenser cooling system and reduces peak loading to the utility companies by up to 2 KWH per household. This energy savings is accomplished by the ECCU supplying cool air to the condenser unit, permitting it to operate in its peak efficiency temperature range.

To further enhance the efficiency of the ECCU, several controls are provided to limit the use of the ECCU when the outside temperature is moderate and when the condenser unit will operate efficiently without needing the ECCU. In addition, when the outside temperature is low enough for the condenser unit to switch into heat pump mode, the ECCU is disabled.

The Evaporative Cooled Condenser Unit employs a quiet motor/fan system that pulls air across an evaporative media pad, through a drift eliminator, and delivers cool air to a condensing unit thereby increasing the operating efficiency of the air conditioner via a condenser enclosure that is adjustable for various sizes of condenser units and that includes a plurality of barometric dampers to provide failsafe operation and provide for air flow to the condenser during heat pump operation without the motor of the ECCU operating.

BRIEF DESCRIPTION OF THE DRAWINGS

FIGS. 2A and 2B are schematic diagrams of embodiments of an ECCU according to the present disclosure using a series convention.

FIG. 3 is a is a schematic diagram of an embodiment of an ECCU according to one embodiment of the present invention using a parallel convention.

FIGS. 5A-5D are cross sectional views of embodiments of a cooling module, as disclosed herein.

FIGS. 6A-6D are perspective views of embodiments of a cooling module without the housing, or with a portion of the housing removed, as disclosed herein.

FIGS. 7A-7F are views of embodiments of the condenser enclosure with close up views of the barometric dampers, as disclosed herein.

FIGS. 9A-9C are views of an embodiment of a wall panel of the condenser enclosure having barometric dampers and animal protectant screens installed therein.

FIGS. 11A and 11B are views of an embodiment of an all-in-one evaporative condenser cooling unit as disclosed herein.

FIGS. 12-23 are photographs of embodiments of test installations of the ECCU of the present disclosure.

DETAILED DESCRIPTION OF THE PREFERRED EMBODIMENTS

Figure 1A:
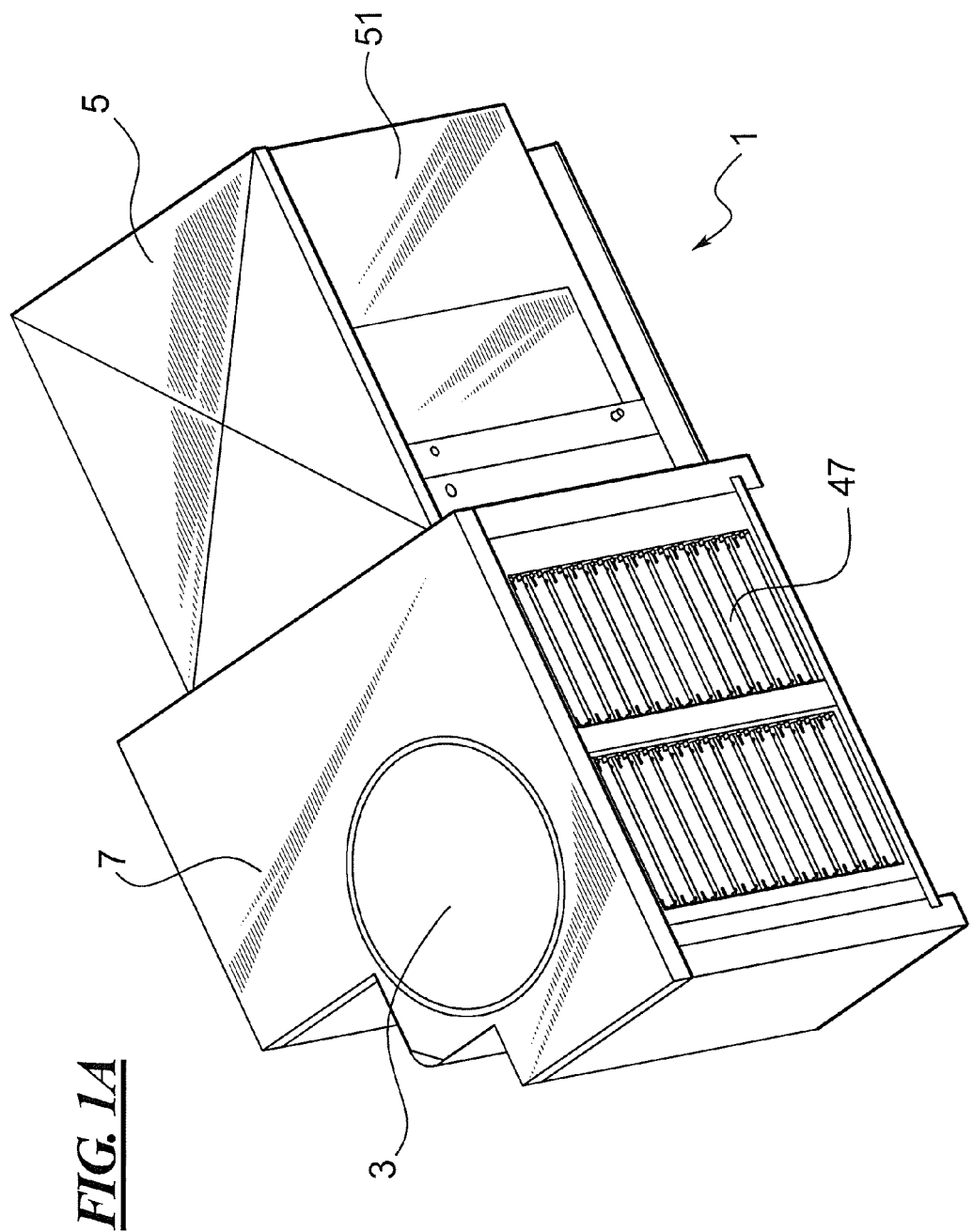
FIGS. 1A and 1B are top isometric views of embodiments of the ECCU assembled with a condensing unit, as disclosed herein.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The drawings include descriptive text and examples identifying components for preferred embodiments, which are incorporated herein by reference.

Figure 1B:
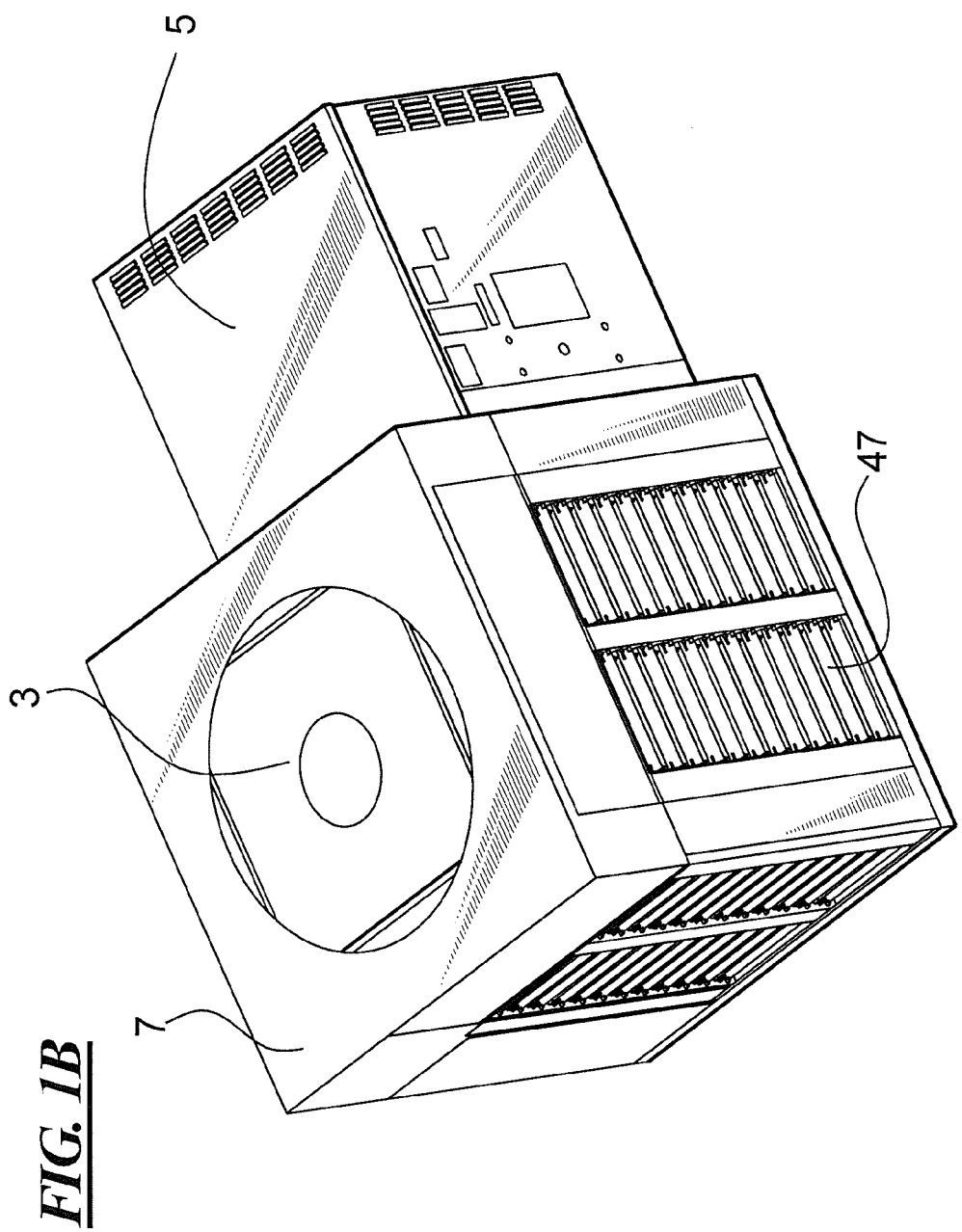

Referring to FIGS. 1A and 1B, there is illustrated a typical application of the evaporative condenser cooling unit, or ECCU 1, with a typical condenser unit 3 of an air conditioner system. Since the focus of the present invention is directed to the ECCU 1 and its cooling module 5 and condenser enclosure 7, details on the operation of the air conditioner system itself are not provided. The present cooling system can, however, be adapted to a wide variety of different air conditioner systems by being adapted to fit onto various different condensers of the air conditioner system, as will become apparent in the following.

In brief, the ECCU 1 delivers cool air, which may be up to 40 degrees F. cooler than the outside temperature, to the condenser unit 3 thereby permitting the condenser unit 3 to operate more efficiently with less power consumption. The reduced power usage at peak operating times of the day will reduce peak demand on the utility companies. The three portions of the device 1 shown in FIGS. 1A and 1B include, as the first portion, the cooling module 5 where the cool air is made by evaporating water and is moved with a low noise fan 9 and efficient motor 11, and, as the second portion, the condenser enclosure 7 which directs and distributes the cool air made in the cooling module 5 to the condenser unit 3. The third portion of the ECCU 1 includes a new, or optionally an existing, conventional residential or commercial air conditioning condensing unit 3 of an air conditioner system.

The cooling module 5 has an air inlet 13 into which outside air is drawn and from which air is fed into the condenser enclosure 7. The condenser enclosure 7 encloses the air inlet openings of the condenser unit 3 so that cooled air from the cooling module 5 is supplied to the condenser unit 3. In the illustrated embodiment, the condenser enclosure 7 encloses the lateral air inlet surfaces of the condenser 3 as well as the condenser's electrical control panel and leaves exposed the air outlet 17 at the top of the condenser unit 3. The condenser enclosure 7 has a generally rectangular overall shape. In an alternate embodiment, a portion of the condenser enclosure 7 may expose the electrical control panel 19 of the condenser unit 3. In a preferred embodiment, the condenser 3 depicted in the embodiments of FIGS. 1A and 1B is centered within the condenser enclosure 7, however in alternate embodiments the condenser 3 may be offset from the center of the condenser enclosure 7, depending on compressor location and installation conditions.

Figure 2B:
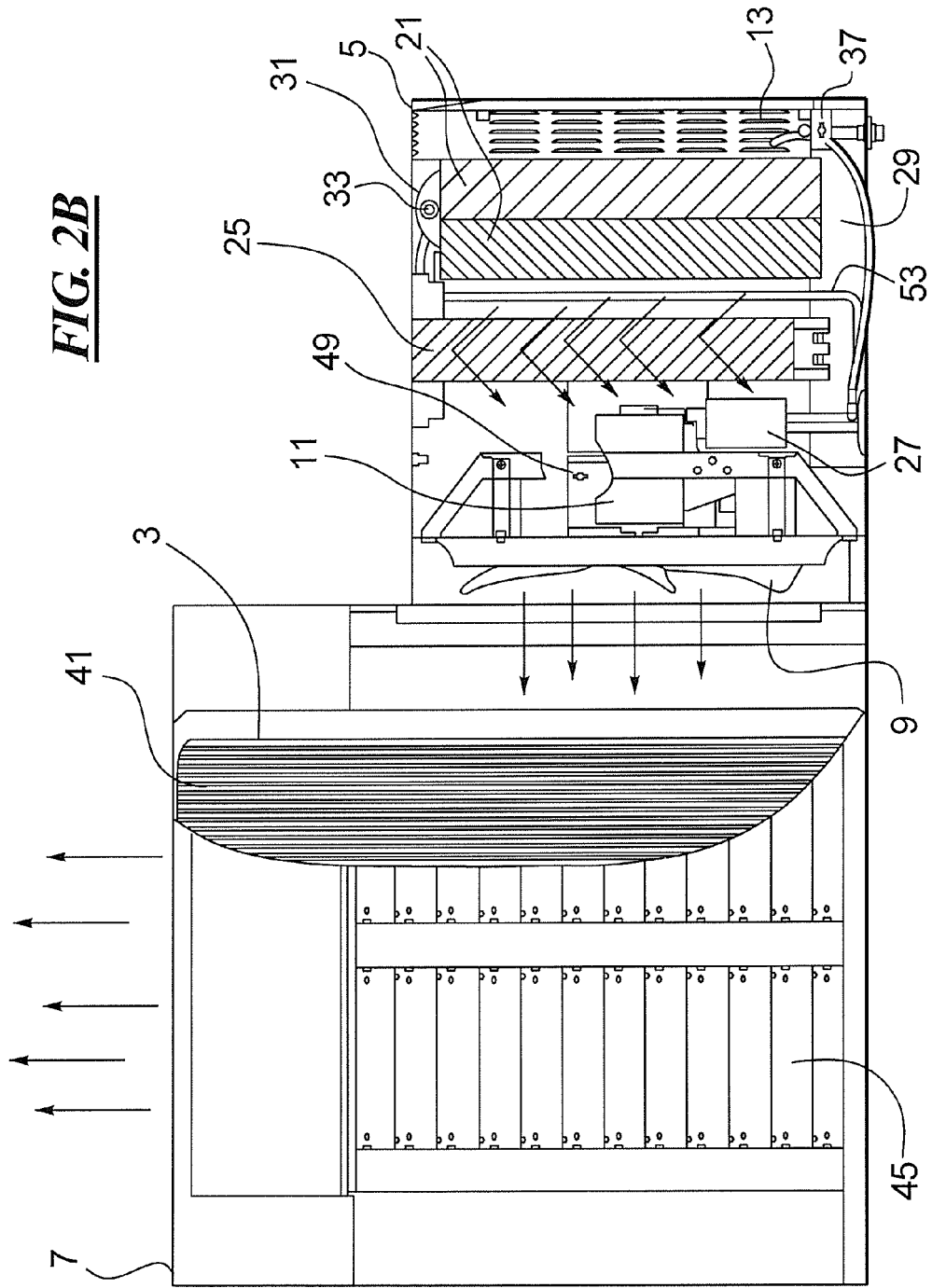

Referring now to FIGS. 2A and 2B, ambient air enters the ECCU 1 at the far right side of the drawing and is drawn through a wet evaporative media 21 as indicated by the arrows. In one embodiment, the ambient air is drawn into the cooling module by the swept fan driven by a motor. In one embodiment, the motor may be an 1100 rpm 6 pole motor, or other motor suitable for moving the fan to draw air into the cooling module. The wet evaporative media 21 of one embodiment is a block of corrugated sheets forming air channels through which the air is drawn. The corrugated sheets are formed of absorbent fibers such as paper and are supplied with water via a water distribution system so that the air flowing through the air passageways of the evaporative media 21 block cause evaporation of the water in the media 21, with a resultant cooling of the air. In one example the evaporative media 21 may be a 4-inch thick block or pad of absorbent expanded paper material. In an alternate example, the evaporative media 21 may include two or more separate materials or blocks of material, such as for example a 4-inch thick low density absorbent expanded paper pad stacked adjacent a 4-in high density absorbent expanded paper pad. In another example, the evaporative media 21 is a Celpad brand evaporative media by Nature Cool or a Celdek brand evaporative media by Munters, which are corrugated paper impregnated with wetting agents, anti-rot salts, and rigidifying resins. Other media can be used as well, including Coolpad, Duracool, Aspen pads, Glassdek, or Alveolate paper, for example. After the air passes through the evaporative media 21, it then passes thru the drift eliminator 25 where moisture particles in the air are removed. The cooled air with the water removed is pulled past the motor 11 and the motor driven swept fan assembly 9 and into the condenser enclosure 7 that provides the cooled air to the condenser unit 3 of the air conditioner system.

In addition to the air management by the present device, the system also provides water or moisture management. The evaporative media 21 is wet by water carried by a sump pump 27 that is standing in a water sump 29 or reservoir from which the water is pumped to a water distributor 31 that is mounted over the evaporative media 21. In one embodiment, the water distribution system includes a pipe 33 along the length of which are a plurality of holes from which water is sprayed onto a curved, downwardly directed surface 35 of the water distributor 31. The curved, downwardly directed surface 35 disperses water over the evaporative media 21. In a preferred embodiment, the curved downwardly directed inner surface 35 of the water distributor 31 is configured to provide one or more continuous sheets of water to the evaporative media 21. The water distributor 31 is mounted toward the inlet side of the evaporative media 21. In one example, the downwardly directed surface 35 of the water distributor 31 is textured with hair cell.

In one embodiment, the drift eliminator 25 may be a 4-inch thick block or pad of absorbent expanded paper material. However in alternate embodiments, the drift eliminator may have different dimensions or be made from additional alternate materials without departing from the scope of the present disclosure. For example, the drift eliminator 25 of an alternate embodiment may be a block of non-absorbent material, such as PVC, formed with air passageways disposed at one or more angles to the air flow direction so that air passing through the passageways causes water droplets to collect on the angled walls of the passageways, where the water is collected and directed to the water reservoir 29. In one example, the drift eliminator 25 is an Accu-Pak CF80Max drift eliminator by Brentwood Industries, although other drift eliminators may of course be used, such as for example two louvered panels with Aspen pads sandwiched between the louvered panels. Depending on the configuration of the drift eliminator 25 and the angle of the air passageways through the drift eliminator, if the air passageways of the drift eliminator have a low angle of air deflection relative to the incoming airflow direction, the drift eliminator 25 itself may be mounted at an angle to increase the angle of air deflection and aid in returning the collected water to the sump 29. Alternatively, if the air channels of the drift eliminator 25 are at a higher angle of deflection relative to the incoming airflow direction, the drift eliminator 25 may be mounted vertically, as the angle of the air channels in the drift eliminator may already be sufficient to aid in returning the collected water to the water sump 29. In the preferred embodiment, the drift eliminator 25 is mounted vertically.

A float valve 37 is provided in the sump 29 to maintain the water level in the sump 29 at a predetermined level. The float valve 37 controls the in-flow of water from a municipal water supply, for example, or another source. A purge system may be provided to purge water from the sump 29 on a periodic basis to avoid build-up of dirty water, mold, algae and bacteria, and to remove old deposit filled water to keep the cooling module clean and the evaporative media free from calcification. For example, the purge pump may be run every predetermined interval to empty the sump, after which the float valve opens to refill the sump with fresh water. Alternate embodiments provide a bleed off tee in place of the purge pump, but these have proven less efficient from a water use standpoint.

The cold air is routed through the condenser enclosure 7 to the condenser coil 41 of the condenser unit 3. The condenser enclosure 7 includes a housing 43 surrounding the air inlets of the condenser unit 3 to feed the cooled air to the condenser unit 3. The housing 43 is adjustable and permits the present system to be retrofit onto existing air conditioner systems, whether they are new or already in place and operating. A plurality of barometric dampers 45 include hinged louvers 47 that close or open in response to the presence or absence of air pressure from the fan 9. More precisely, the louvers 47 open or close due to the differential air pressure inside and outside the housing 43. When the fan 9 is operating to blow cool air from the cooling module 5 to the condenser enclosure 7, the dampers 45 move to or remain in a closed position and distribute the cool air to the condenser unit 3. In the event that the air conditioner is operating and the condenser's fan is drawing air over the condenser coil 41, but the fan 9 of the cooling module 5 is not providing a positive air flow into the condenser enclosure 7, for example in the unlikely event of an EECU cooling module 5 failure and/or if the condenser unit 3 is in a heat pump mode or when the cooling module of the ECCU is disabled, then the barometric dampers 45 move to an open position to permit the condenser unit's fan to draw in ample exterior ambient air through the open dampers 45 and over the condenser coil 41 so that the condenser unit 3 can continue to operate. A temperature sensor and switch 49 is connected to disable the cooling module 5 of the ECCU 1 when the cooled air provided by the cooling module 5 drops below a predetermined temperature, where it is not economical to operate the ECCU 1 efficiently (for example, say 80 degrees). Additional circuitry in the temperature switch 49 will disable the cooling module 5 of the ECCU 1 when the condenser unit 3 is in a heat pump mode.

Referring now to FIG. 3, an installation of the evaporative condenser cooling unit or ECCU 1 is shown in which a single cooling module 5 is provided for two condenser enclosures 7 that are provided on two respective air conditioner condenser units 3. In general, the features, components, and structures of this configuration are the same as that illustrated in FIGS. 1A-2B, except that two condenser enclosures 7 are provided. For these items, the same reference numerals have been used and it is to be understood that the same functioning occurs with regard to those same components. The differences between FIGS. 2A-2B and FIG. 3 are the layout of the various portions of the system. In FIGS. 2A-2B, the layout is best described as a single cooling module 5 providing cool air for one condenser unit 3. In FIG. 3, the layout is best described as a single cooling module 5 providing cool air for multiple condenser units 3.

Figure 4:
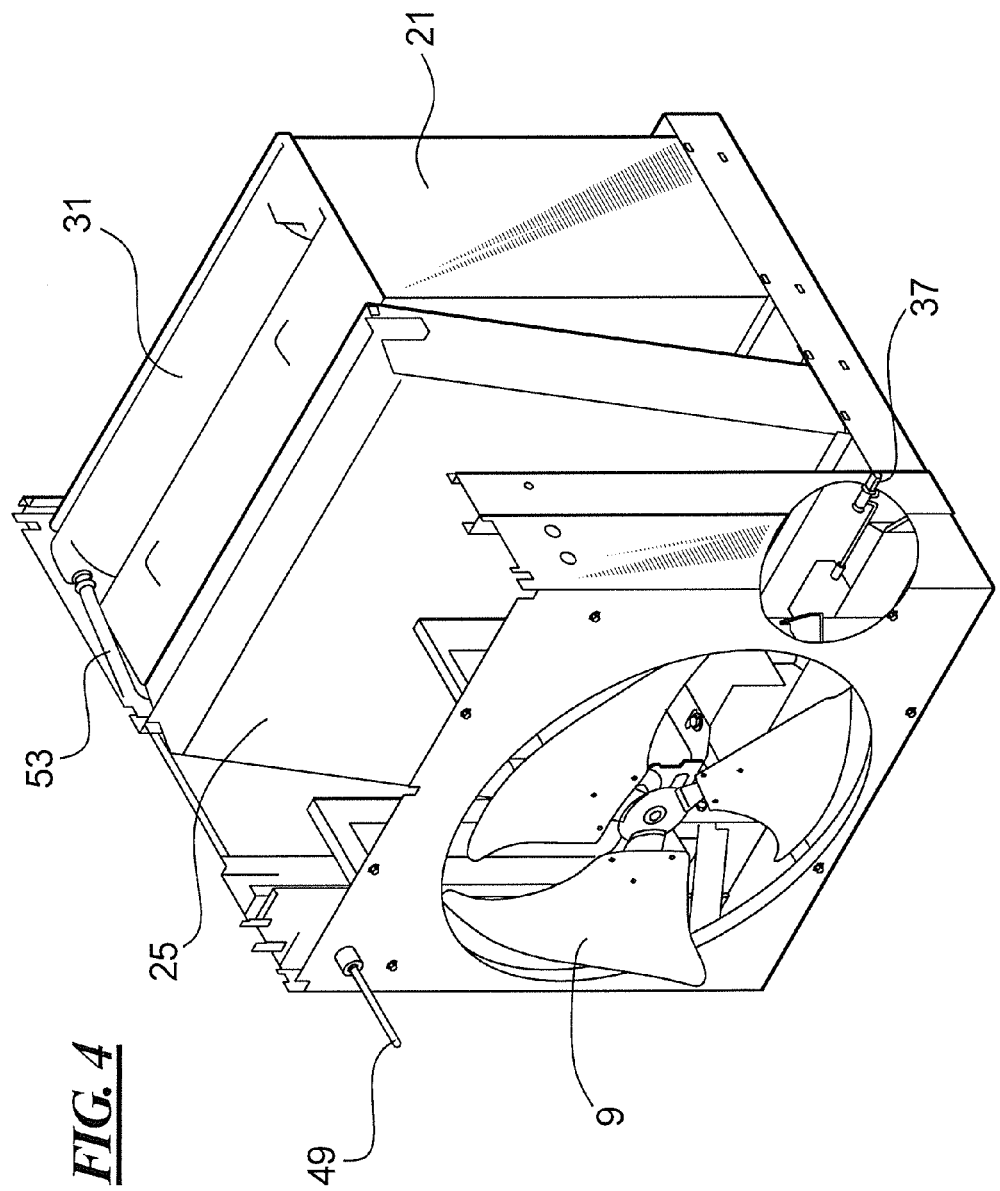
FIG. 4 is a top perspective view of an embodiment of a cooling module with the housing removed, as disclosed herein.

FIG. 4 shows the cooling module 5 with the outer cover 51 removed. The block of evaporative media 21 is provided at an air inlet of the outer cover 51, behind which is mounted, at an angle, the drift eliminator 25. A water distributor 31 is mounted on top of the evaporative media 21. Air is drawn through the evaporative media 21 and drift eliminator 25 by the fan 9. The fan 9 has a swept fan blade configuration with elongated shark fin shaped blades to reduce the noise of the fan 9 during operation. A temperature sensor and switch 49 is mounted to sense the air temperature and control the operation of the cooling module 5. The cooling module 5 is turned off when the air temperature inside the cool air distributor falls below a predetermined temperature. In an alternate embodiment, the temperature sensor and switch may measure the temperature of the ambient external air and turn off the cooling module when the ambient external air temperature falls below a predetermined temperature. A float valve 37 is mounted in the water sump 29 at the lower portion of the cooling module's outer cover 51. The float valve 37 controls the flow of water into the sump 29 from a water supply, such as a municipal water supply, to maintain the water in the sump 29 at a level appropriate for the sump pump 27 that supplies water to the water distributor 31. The fan's motor mounts are visible in FIG. 4.

FIGS. 5A and 5C are cross sectional views through embodiments of the cooling module 5 showing the water carrying pipes 53 that travel from the sump pump 27 to the water distributor 31. The lower end of the evaporative media 21 and the lower end of the drift eliminator 25 extend into the water sump 29 at the lower portion of the cooling module's outer cover 51. Excess water from the evaporative media 21 and water collected by the drift eliminator 25 are returned to the water sump 29. The drift eliminator 25 includes a plurality of fins or ducts 55 that define air flow channels that force the air to change direction as it passes through the drift eliminator 25, so that water droplets in the air are deposited on the surface of the fins or ducts 55 and are collected from the air. The drift eliminator 25 may be mounted at an angle as shown, for example a 10 degree angle, or may be mounted vertically. The drift eliminator 25 can be another piece of evaporative media which is not supplied with water, a Drop Stop product from Munters, or a DrifDek product from Munters. Other drift eliminators 25 are of course possible. It is contemplated to use louvered panels with Aspen Pads or other evaporative media between them. An overflow standpipe 39 is provided in the water sump 29 to prevent excess water from accumulating in the sump 29 and to rid the sump 29 of some of the dirty water. Other embodiments may be provided without the overflow or with a purge pump, as will be described.

FIGS. 5B and 5D show embodiments of the water distribution system 23 for applying water to the evaporative media 21. Water is pumped from a water sump 29 through a water carrying pipe 53 and into the water distributor 31 where it is applied to the evaporative media 21. The water distributor in this embodiment includes a pipe having openings 33 disposed therein that spray the supplied water onto curved downwardly directed surface 35 disposed above the evaporative media 21 that distributes the water to the evaporative media 21 in a more uniform manner. A texture may be provided on the curved surface 35, such as hair cell.

Figure 6D:
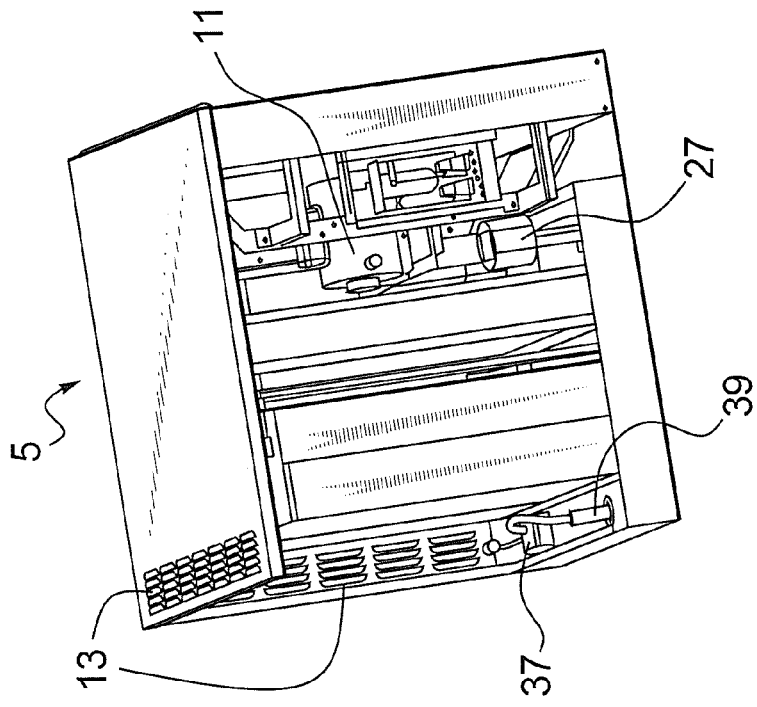
Figure 6C:
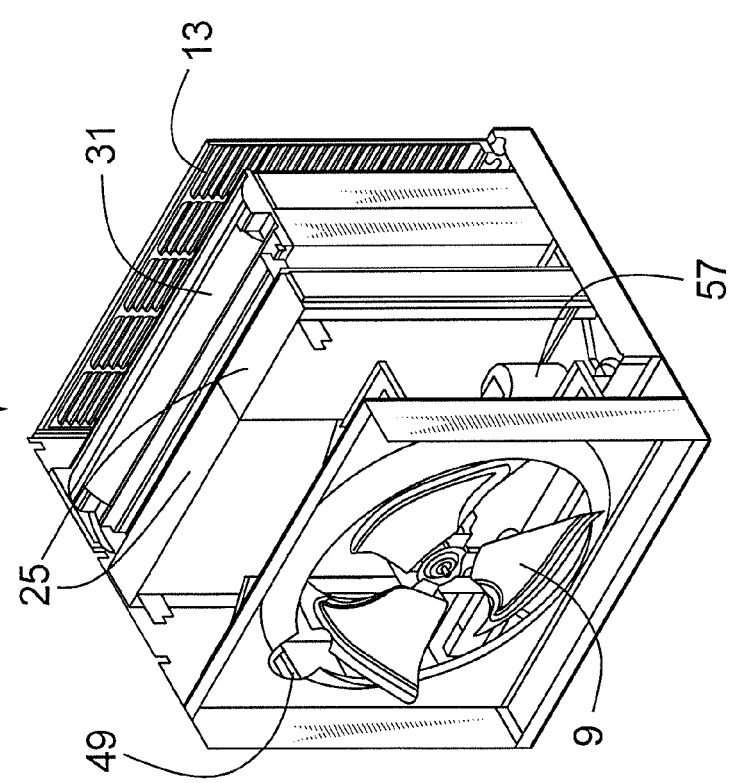

FIGS. 6A and 6C show embodiments of the cooling module 5 similar to that shown in FIG. 4. In the views of FIGS. 6B and 6D, a purge pump 57 is provided in the illustrated embodiment. The purge pump 57 drains the water sump 29 at a predetermined interval to remove deposit filled water, thereby keeping the cooling module 5 clean and the evaporative media 21 free of calcification. FIGS. 6B and 6D also show the projecting cowling of the fan housing.

Figure 7D:
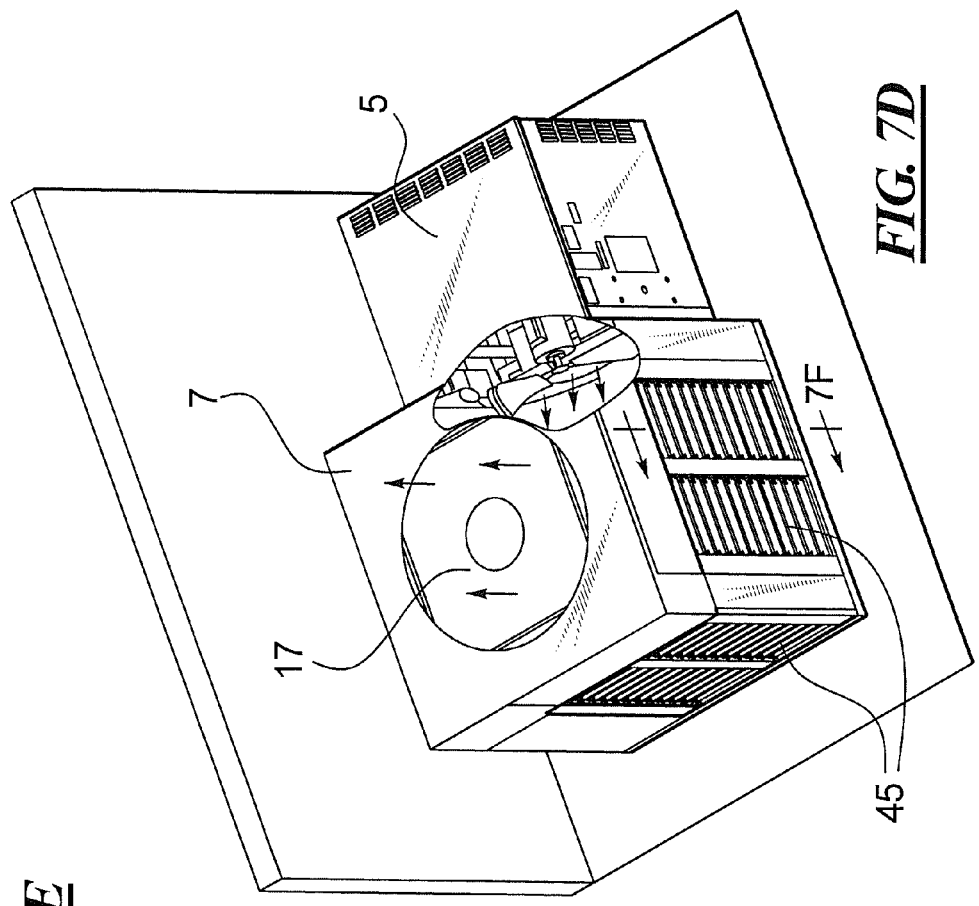
Figure 7E:
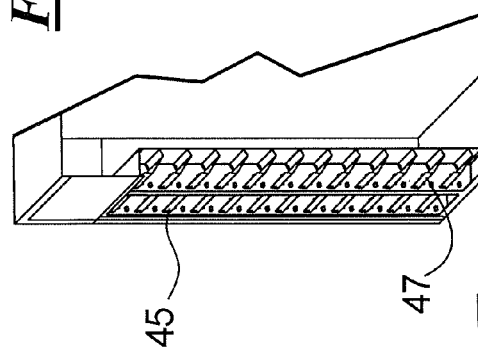

FIGS. 7A and 7D show embodiments of the cooling module 5 connected to the condenser enclosure 7 that is mounted around the air conditioner condenser unit 3. A cut-away shows the air flowing to the condenser enclosure 7. Exhaust air is driven from the condenser unit 3 in an upward direction as indicated by the arrows. The walls of the condenser enclosure's housing 43 are provided with barometric dampers 45, except for the portion of the condenser enclosure that is cut in to expose the electrical control panel 19 of the condenser unit 3. FIGS. 7B and 7E show embodiments in which the barometric dampers 45 are in an open position when the condenser unit 3 is operating but the cooling module 5 is not providing cooled air to the condenser unit 3. Outside ambient air is drawn in through the open dampers 45 so that the condenser unit 3 operates as it would without the ECCU 1.

Figure 7F:
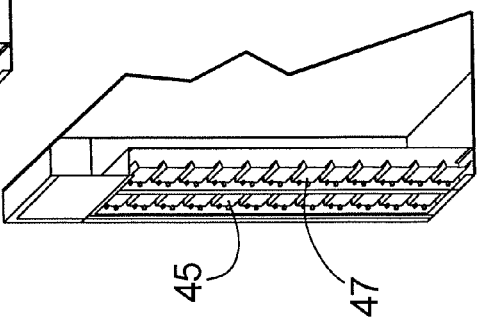
Figure 8B:
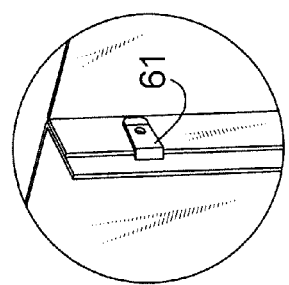
FIGS. 8A-8H are views of embodiments of modular snap together panels, as disclosed herein.
Figure 8F:
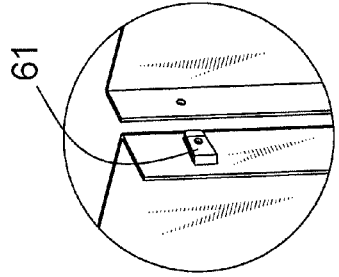
Figure 8A:
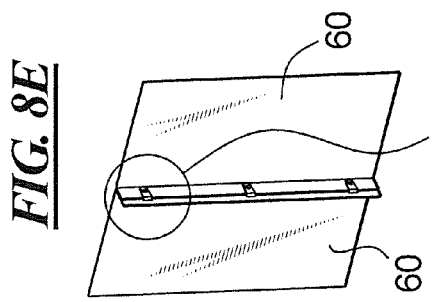
Figure 8E:
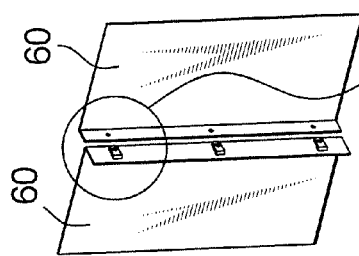
Figure 8D:
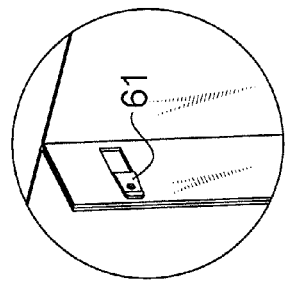
Figure 8H:
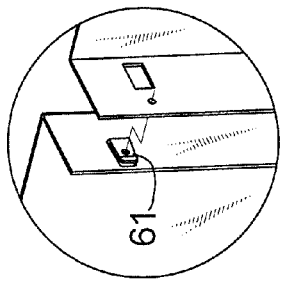
Figure 8C:
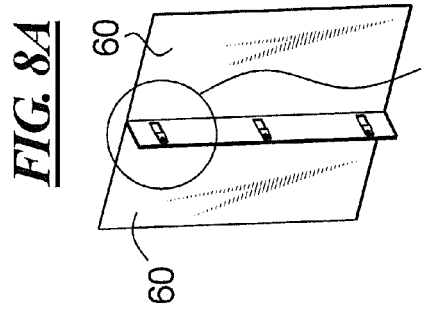
Figure 8G:
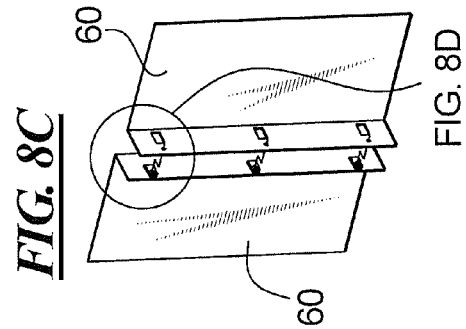
Figure 10B:
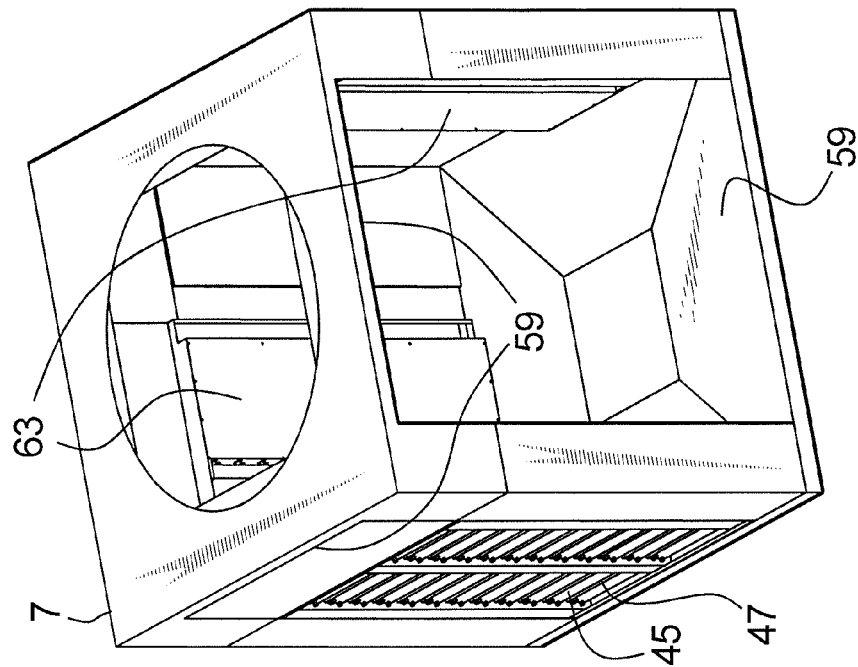
FIGS. 10A and 10B are views of an embodiment of a condenser enclosure as disclosed herein.
Figure 10A:
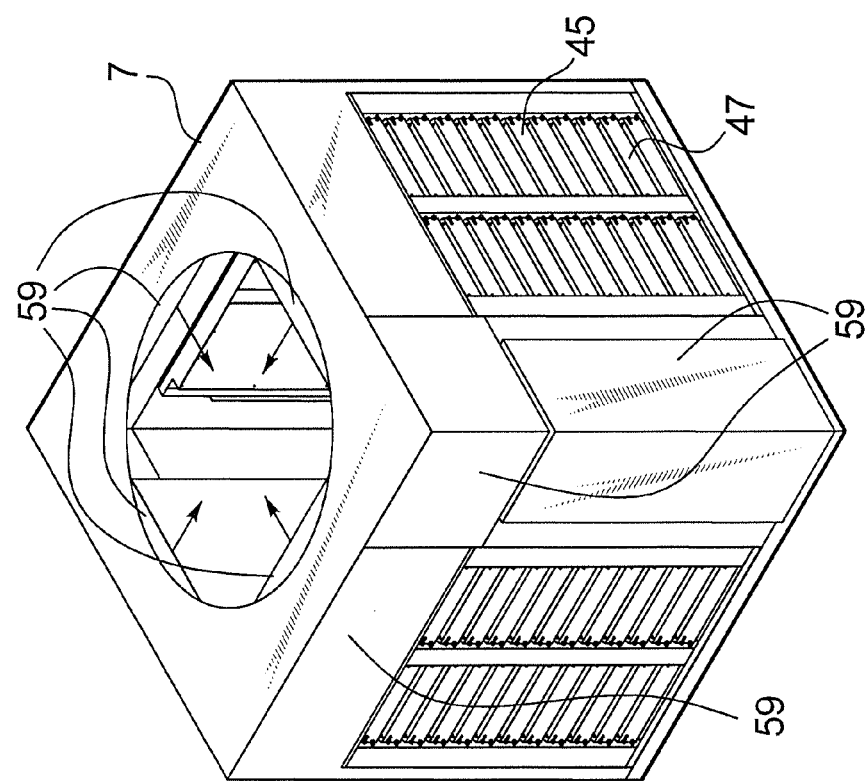

FIGS. 7C and 7F show embodiments in which the barometric dampers 45 are in the closed position, which closes the walls of the housing 43 of the condenser enclosure 7 to the in-flow of air there through and ensures that the air supplied by the cooling module 5 is provided to the condenser unit 3. The barometric dampers 45 of a preferred embodiment are galvanized steel louvers 47 that are hinged to move between the open and closed position. The dampers 45 may instead be made of extruded aluminum, of plastic, of cold rolled steel, extruded plastic, or other materials. When the cooling module 5 is turned off, the barometric dampers 45 default to a closed position. The barometric dampers 45 remain in the closed position when the fan 9 of the cooling module 5 is operating to provide positive air pressure, relative to the ambient external air pressure, to the interior of the condenser enclosure 7.

A relay is provided that is connected to the condenser unit 3 so that when the condenser unit 3 turns on, the relay turns on the cooling module 5. The relay can be added to the air conditioner system or an existing relay in the condenser unit 3 can be used. The cooling module 5 pressurizes the condenser enclosure 7 and provides the positive internal pressure that keeps the barometric dampers 45 closed. The cooling module 5 provides cool air that surrounds the condenser unit 3. The condenser unit 3 in turn draws in the cool air as the air conditioner system operates. The air conditioner is thereby operating at a lower effective outside temperature than it otherwise would be without the ECCU 1. In this manner, the air conditioner does not have to operate for as long in the cooling cycle so it spends more time off and less time on, resulting in a significant increase in energy efficiency. The energy saved by the reduced operation of the air conditioner is far greater than the energy required to operate the fan motor 11 and the sump pump 27 of the cooling module 5. In this manner, a significant net energy savings is realized.

A significant feature of the present system and method is the ability to mount the cool air distribution system 7 on many different types and shapes of air conditioner condenser units 3. In a preferred embodiment, wall panels 59 of various shapes and configurations are fastened together with traditional fasteners, such as screws, bolts and nuts, and rivets. The wall panels 59 may also include hinged panels or panels that slide or glide relative to each other, which may include the use of mechanical glides or rails, to allow the wall panels 59 to be selectively opened for access to the interior of the condenser enclosure. In an alternate embodiment, the wall panels 59 of the condenser enclosure 7 may optionally be snap together wall panels 60 so that panels of different shapes and sizes and configurations can be assembled to fit different types of condenser units 3 or different installation conditions encountered during installation. FIGS. 8A-8H show different configurations of snap connectors 61 that may be used with the optional snap together panels 60 in alternate embodiments. The optional snap connectors 61 may be snapped in a forward direction or snapped in a backward direction. The panels shown in FIGS. 8a-8h are plain, solid snap together panels 60 for purposes of simplicity of illustration. Once the appropriate wall panels 59 are assembled, screws or other fasteners may be provided to secure the wall panels 59 in place to the remainder of the housing 43. Wall panels with barometric dampers 45, plain panels and other types of panels may be assembled to form the condenser enclosure. Wall panels 59, including barometric damper wall panels, of different heights widths, and configurations may be used to accommodate different sized condenser units 3.

Referring to FIGS. 9A-10B, when wall panels containing barometric dampers 45 are used in the condenser enclosure 7, one or more animal protection screens 63 may be optionally fastened to the wall panel 59. The protection screens 63 may be fastened to a back surface of the wall panel 59 so that when the panel is assembled to the condenser enclosure, the screens will be located interior relative to the dampers 45. In an alternate embodiment, the protection screens 63 may be fastened to a front surface of the wall panel 59 so that when installed, the dampers 45 will be located interior relative to the screens 63 with the screens 63 otherwise located on the outside of the housing of the condenser enclosure. In either configuration, the protective screens 63 will permit the barometric dampers 45 to open and close properly, during normal operation of the ECCU 1. The animal protection screens 63 may be woven wire mesh screens, perforated panels, or other similar types of screens that prevent small animals from gaining access to the interior space of the condenser enclosure 7.

It is envisioned that duct work or other air flow channels (not shown) may be provided between the cooling module and the air distribution unit in some installations. Other arrangements of the ECCU 1 and elements within the ECCU 1 are envisioned and are encompassed within the scope of this invention.

The present invention also is directed to a method for cooling air and delivering cooled air, as is apparent from a review of the present disclosure.

An example of an installation of the present ECCU 1 is shown in FIG. 11, wherein the cooling module 5 is mounted to the side of the condenser enclosure 7, and the condenser enclosure 7 surrounds a condenser 3 of an air conditioner system for a house. The example is provided for testing purposes as a prototype and has been provided with an electrical meter to determine the efficiency of the unit. Installations of the present system will generally not include a separate electrical meter.

Figure 13:
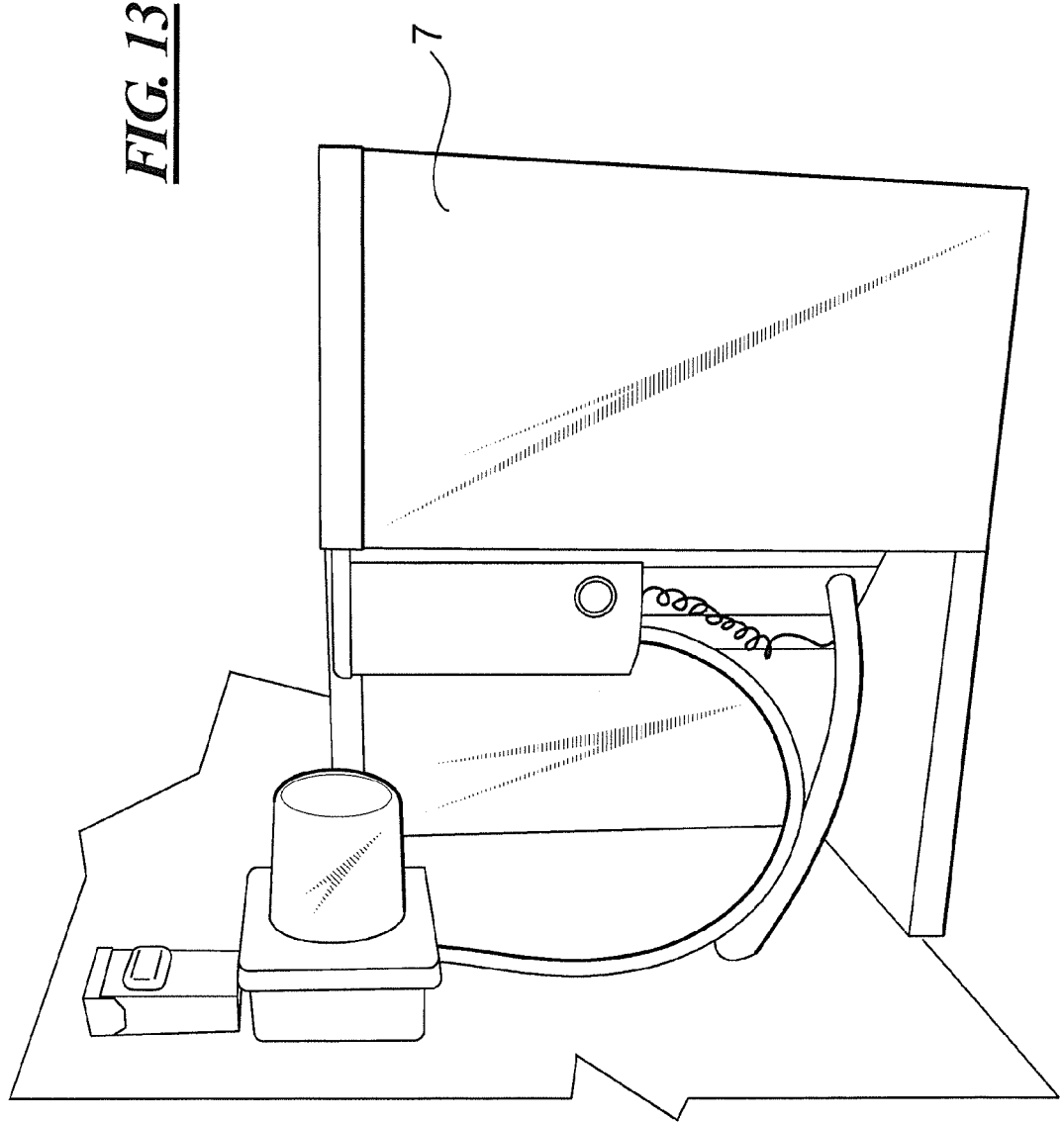
Figure 14:
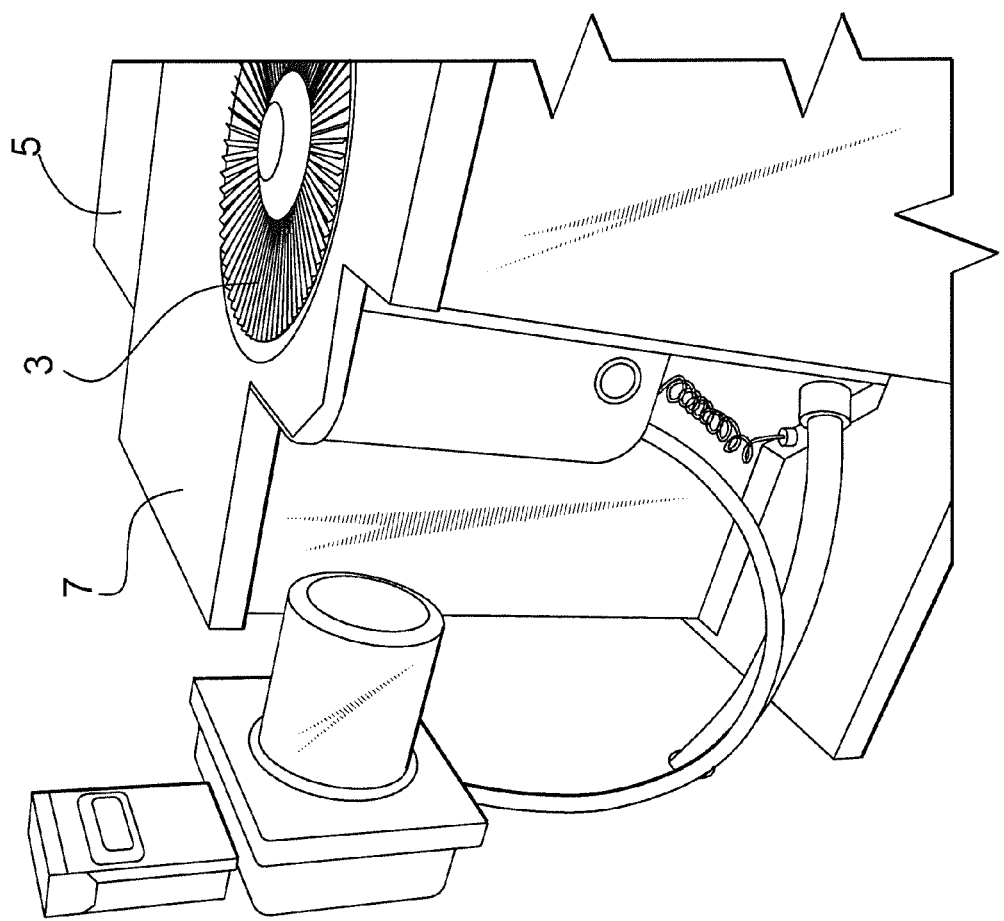

FIG. 13 shows the condenser enclosure 7 surrounding the condenser unit 3 except for the electrical connections and controls panel 19 of the condenser 3, which is available for access. In FIG. 14, the electrical connectors provide power to both the condenser and to the cooling module. A gauge is provided for testing purposes in the prototype. The original housing of the condenser unit 3 is accessible at the inset corner of the condenser enclosure 7.

Figure 15:
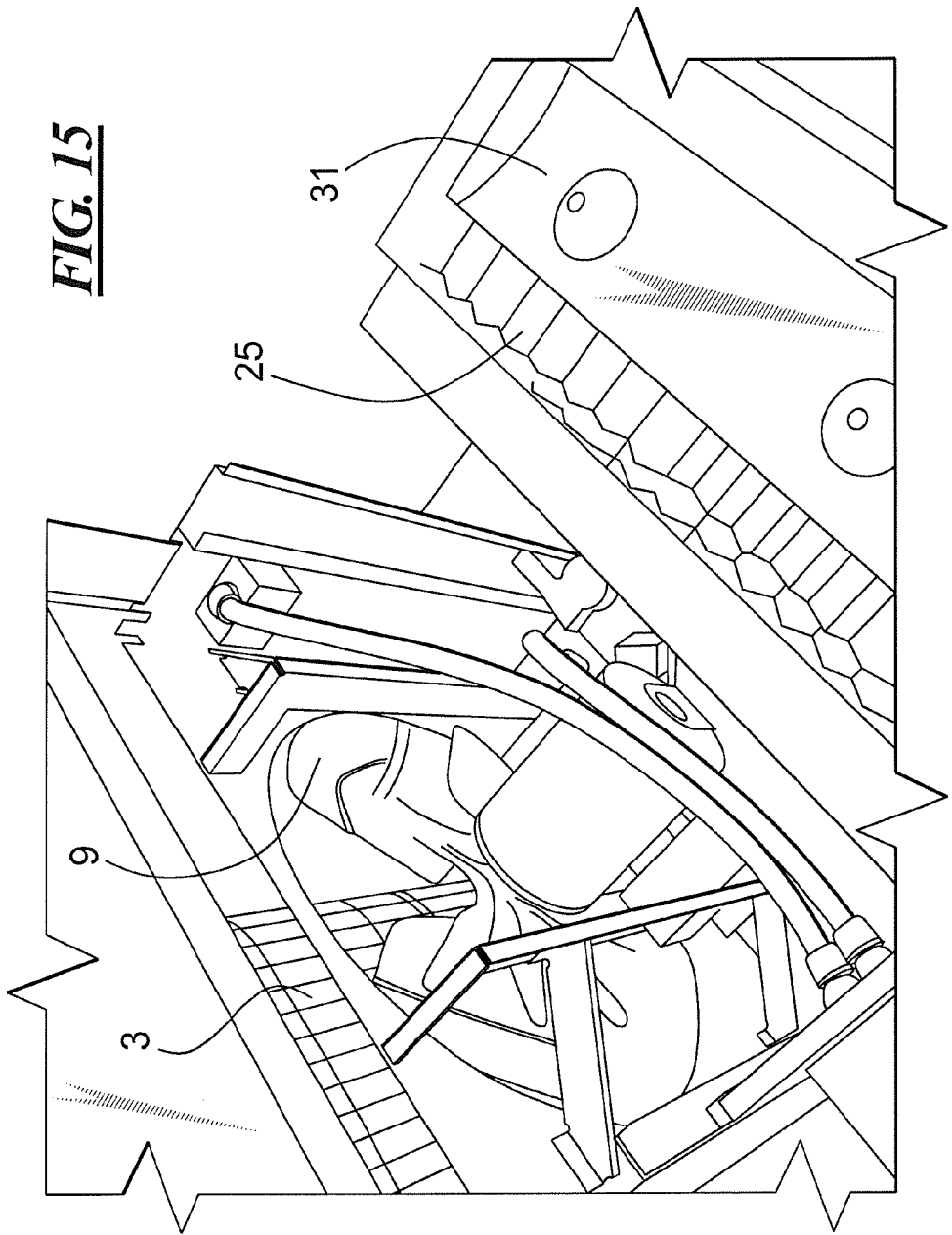

FIG. 15 shows the cooling module 5 with the outer cover 51 removed. The fan 9 and fan cowling are shown as is the fan motor 11 mounted on motor mounts that support the motor 11 and cowling. Electrical conduits and water pipes are provided within the cooling module 5. The sump pump 27 and purge pump 57 may be seen as well. The top of the water distributor 31 is visible, adjacent to the drift eliminator 25.

Figure 16:
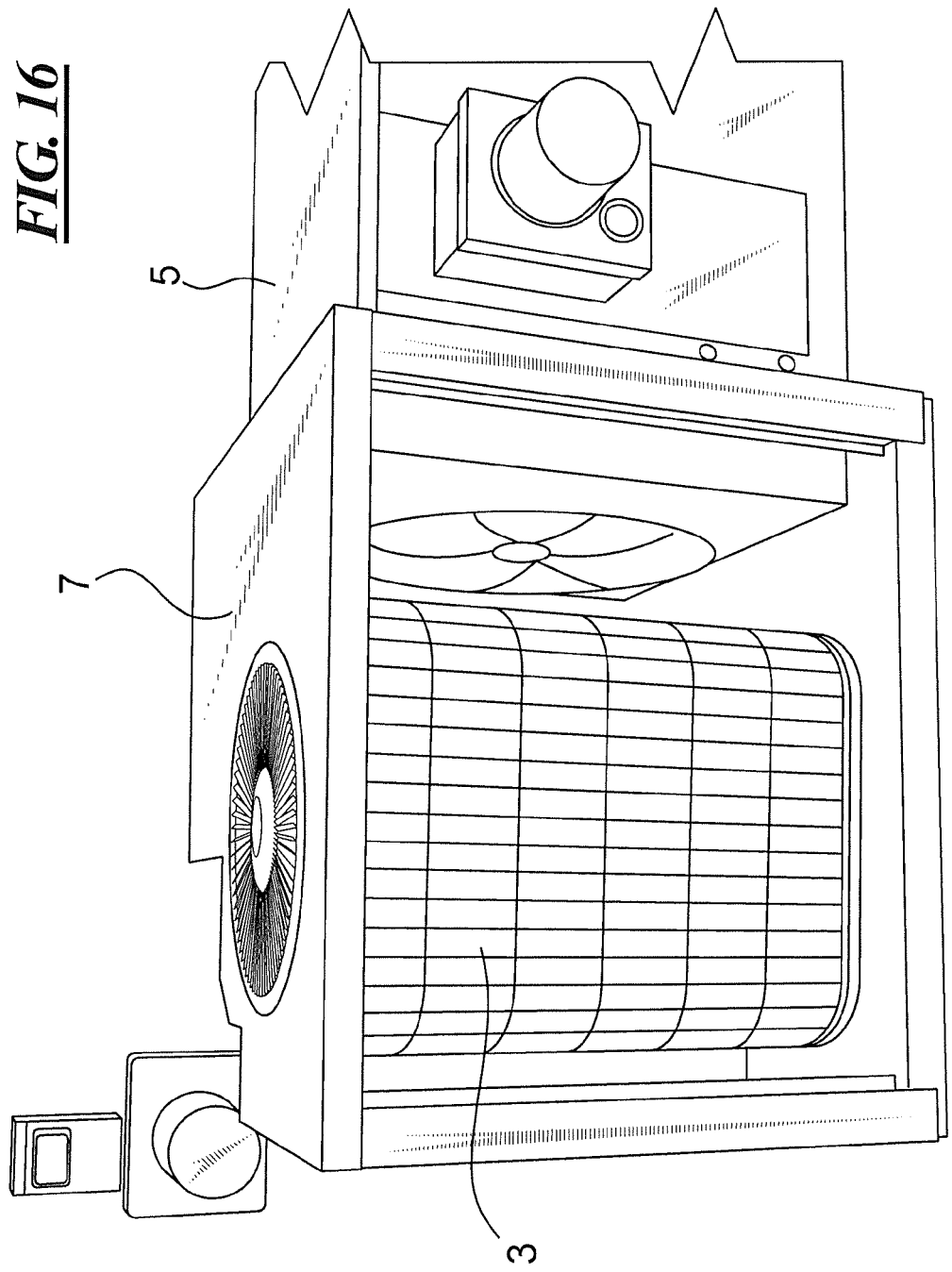
Figure 17:
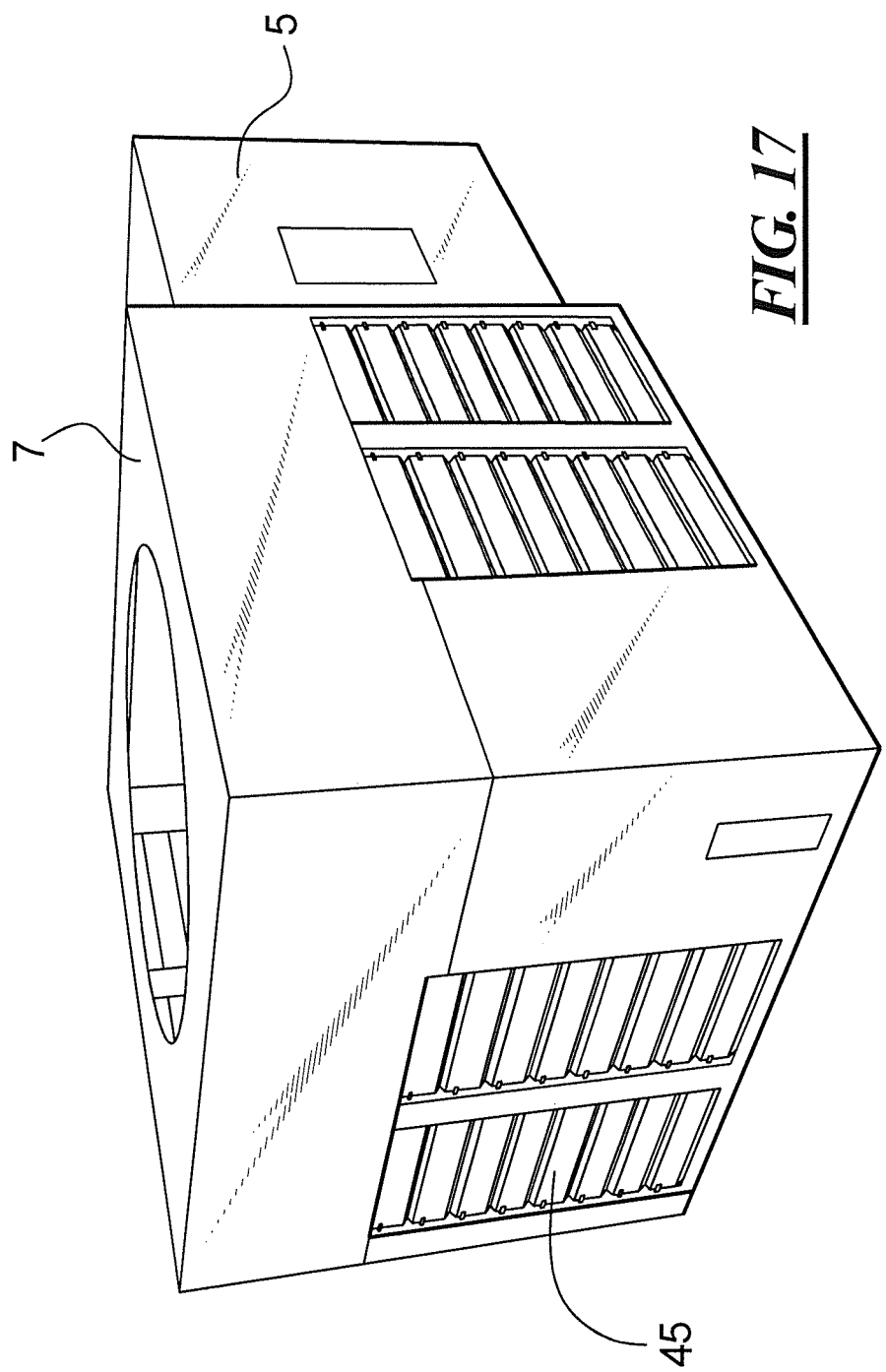
Figure 18:
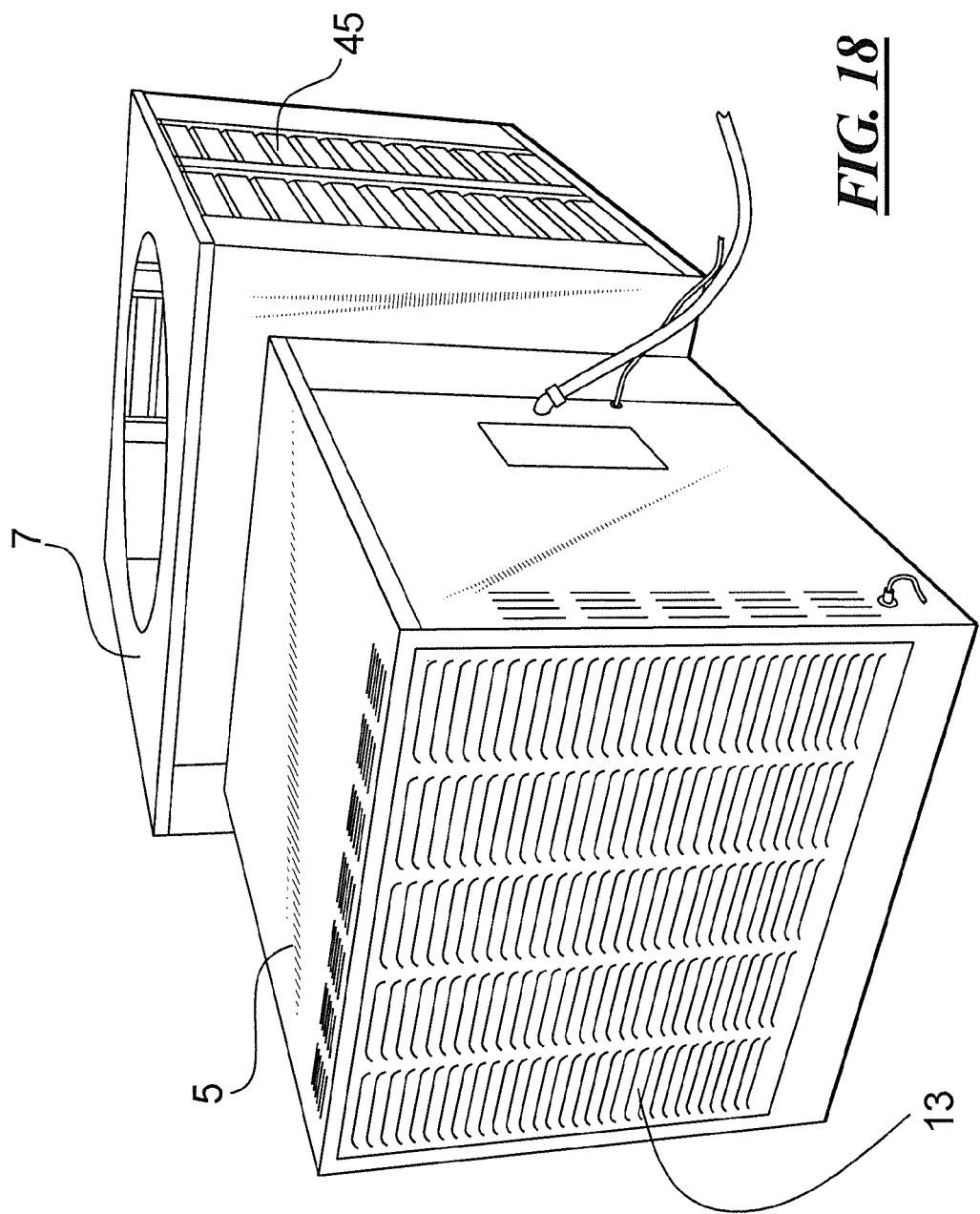
Figure 19:
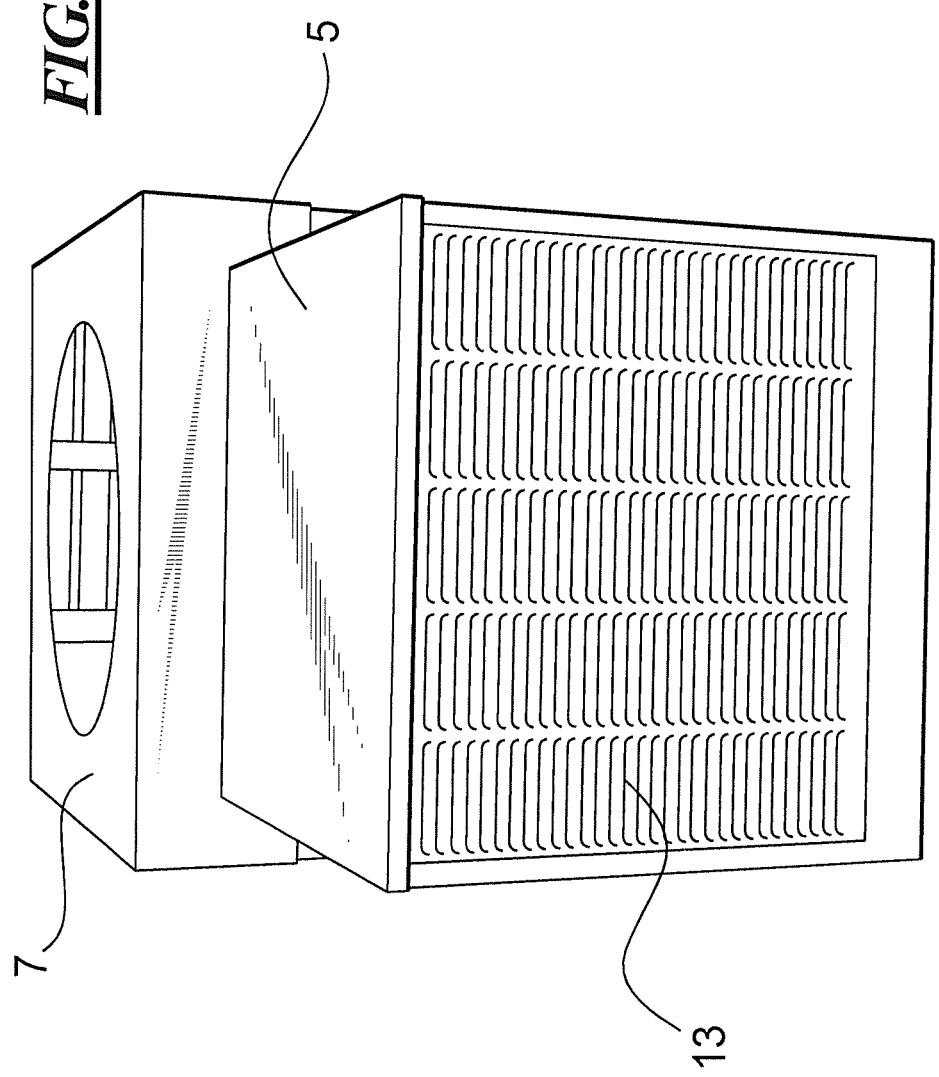
Figure 20:
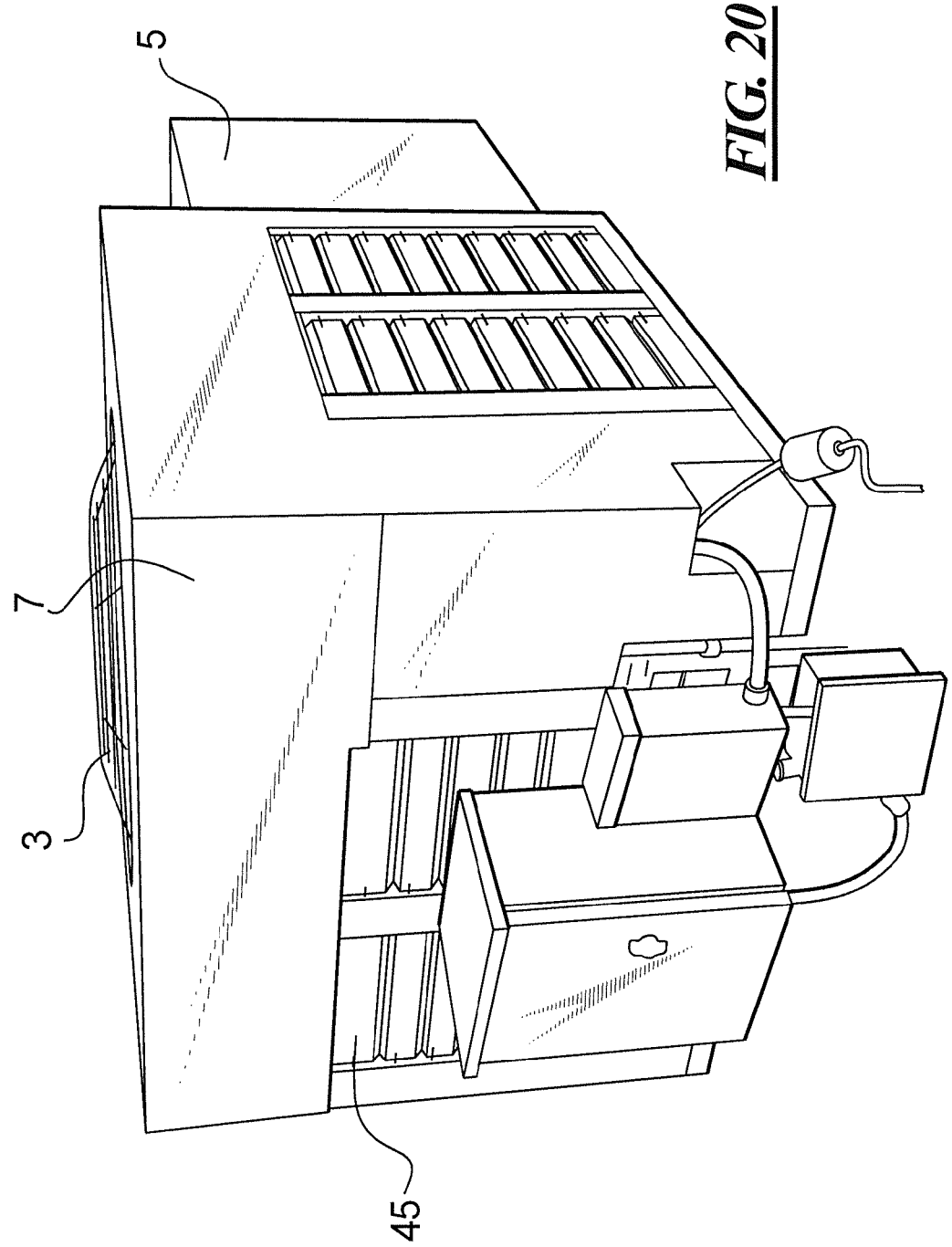
Figure 21:
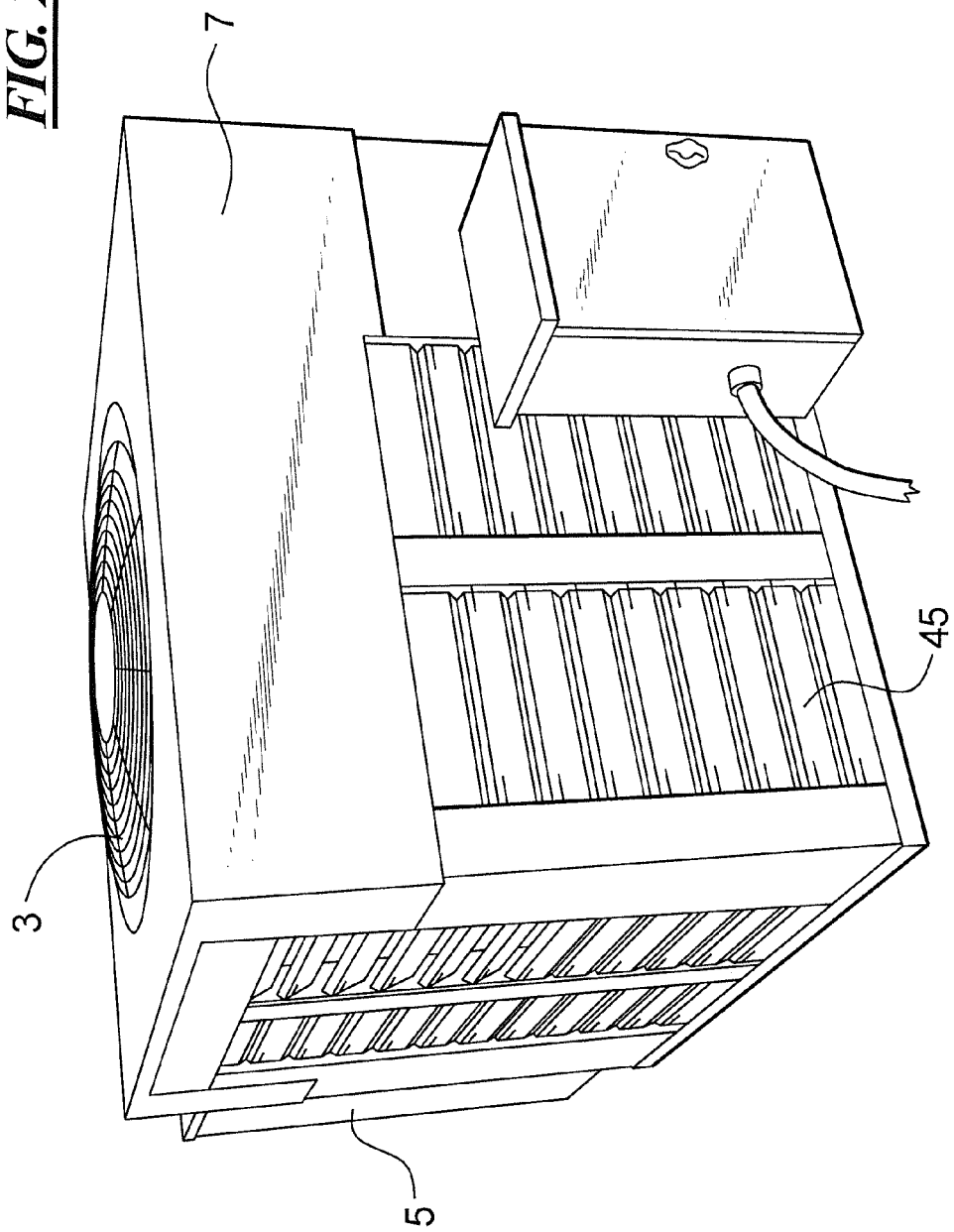
Figure 22:
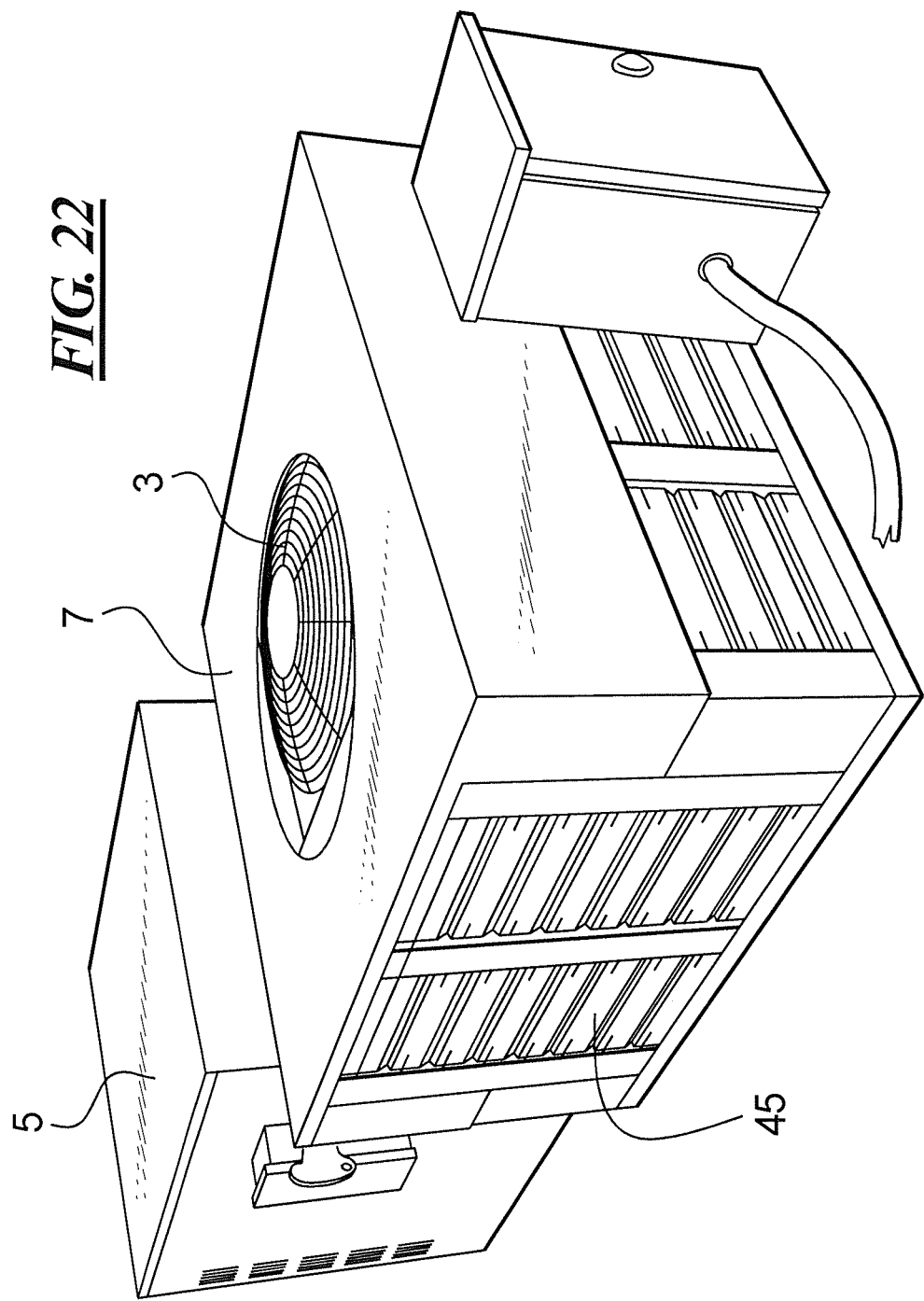
Figure 23:
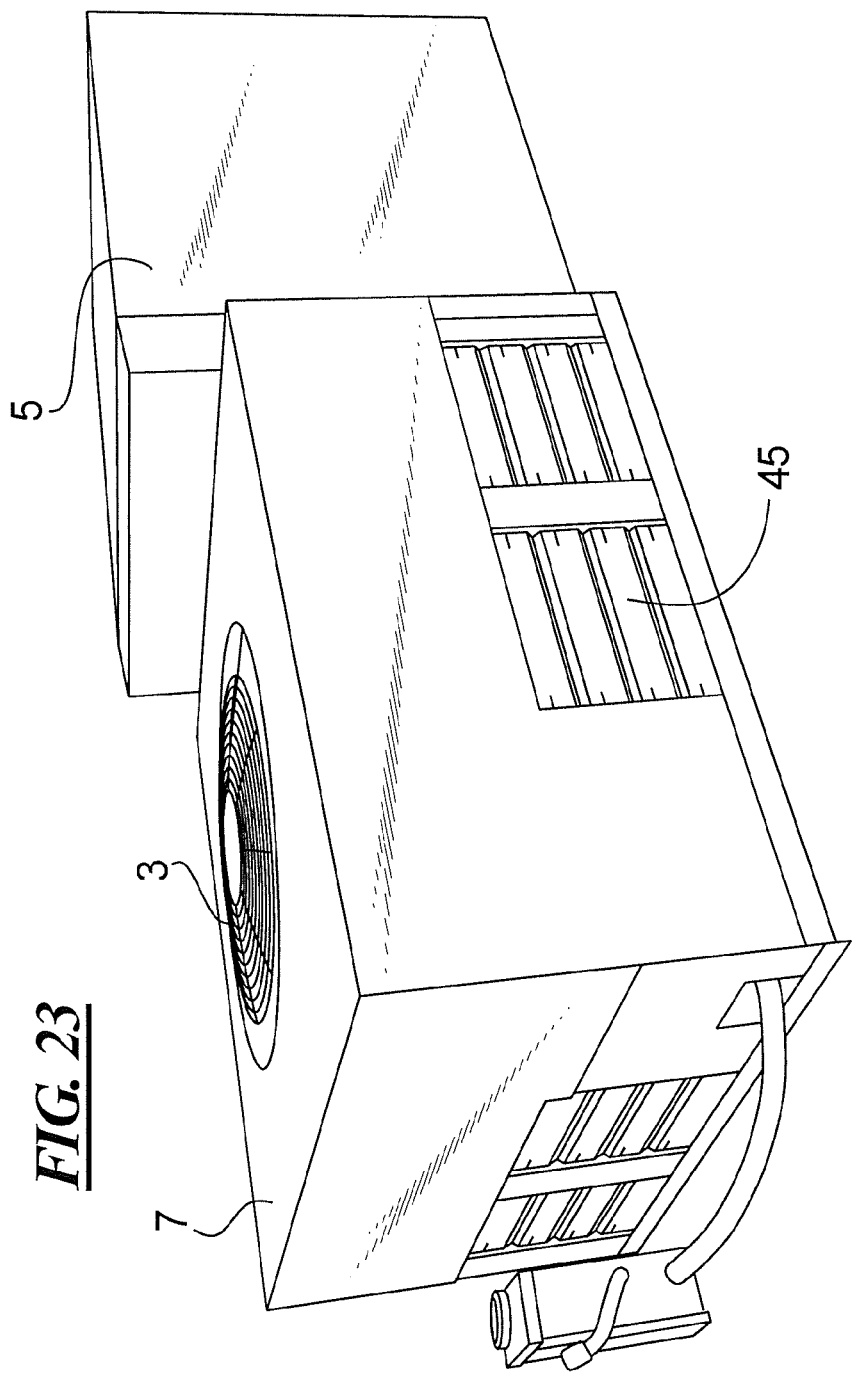

FIG. 16 shows the wall of the housing 43 for the condenser enclosure removed to reveal a standard condenser unit 3 of a home air conditioning system. The ECCU 1 has been mounted on the standard air conditioning unit with little modification of the existing air conditioning system.

FIGS. 17-23 show additional embodiments of the ECCU 1 that includes a condenser unit, a condenser enclosure having a plurality of barometric dampers in the sidewalls thereof, the barometric dampers being in the form of a plurality of hinged louvers, and a cooling module, in various test installations.

Alternative embodiments of the ECCU 1 include a bleed off tube in place of the purge pump for draining dirty water from the sump. In a test of the bleed off tube, a higher level of water usage has been reported however.

Referring to FIGS. 1A-3, in an alternate embodiment, the ECCU 1 includes all three of an air conditioner condenser unit 3, a condenser enclosure 7, and a cooling module 5.

In yet another embodiment, the ECCU 1 of the present disclosure can be a cooling module 5 that is configured to work with and be attached to a package unit air conditioner, which package unit typically may include an air handler, evaporator coil, condenser, and refrigerant compressor all contained in one cabinet, with air supply and return ducts coming from indoors through the exterior walls or ceiling of the building to connect with the cabinet of the outdoor package unit.

Referring to FIGS. 11A and 11B, in still another alternate embodiment, an all-in-one ECCU 1 configuration is disclosed. In such an embodiment, the ECCU 1 still includes a cooling module, a condenser enclosure, and a condenser unit, but in this embodiment, the cooling module and the condenser unit are packaged such that only a single fan 100 and a single motor 102 are needed to draw external ambient air through the evaporative media 104 and drift eliminator 106, through the condenser coil 108 of the condenser unit 110, and out the air outlet 112 of the air conditioner condenser unit 110. In the configuration disclosed in FIGS. 11A and 11B, an outer housing 114 has an upper chamber 116 and lower chamber 118 separated by an internal dividing wall 120. In alternate embodiments, these chambers may be configured sided by side or otherwise and still fall within the scope of the present disclosure. The lower chamber 118 in the configuration depicted in FIGS. 11A and 11B is the cooling module having one or more sidewalls that include external air inlets 122. One or more evaporative media 104 and water distributors 124 for wetting the evaporative media 104 are mounted to, or positioned close to, the inside of the wall of the lower chamber 118 adjacent the external air inlets 122. An opening 126 is provided in the internal dividing wall 120 separating the upper 116 and lower chambers 118, over which, or under which, the drift eliminator 106 is mounted. In the configuration shown in FIGS. 11A and 11B, the drift eliminator 106 is mounted in the upper chamber 116 between the opening 126 in the internal dividing wall 120 and a plurality of air inlets of the condenser unit 110. However, in alternate embodiments, the drift eliminator 106 may be mounted to the opening 126 in the internal dividing wall 120, but be located in the lower chamber 118.

The outer walls of the upper chamber 116 act as the condenser enclosure 132, and house the condenser unit 110. In configurations such as the one depicted in FIGS. 11A and 11B, where the drift eliminator 106 is mounted in the upper chamber 116, the air condenser unit 110 is attached to the air outlet side of the drift eliminator 106. In alternate configurations where the drift eliminator 106 is located in the lower chamber 118, the condenser unit 110 will have its air inlets located directly over the opening 126 in the internal dividing wall 120 separating the lower 118 and upper chambers 116. A single fan 100 and motor 102 are mounted in an opening 134 disposed in the outer wall of the upper chamber 116, providing air communication between the outer ambient air and the interior of the upper chamber 116 or condenser enclosure 132. In this embodiment, the fan 100 located in the opening in the wall of the upper chamber 116, or condenser enclosure 132, is driven by the motor 102. The motor driven fan 100 draws ambient air through the air inlets 122 in the walls of the lower chamber 118 or cooling module, through the wetted evaporative media 104, through the drift eliminator 106 in the upper chamber 116, and out the upper chamber 116 through the opening 134 in which the fan 100 is mounted. With this configuration, a single, compact, efficient ECCU 1 unit is disclosed. The configuration depicted in FIGS. 11A and 11B differs from previous embodiments disclosed herein, in that in this present embodiment, the air inlets 122 of the condenser unit are abutted to the outlet of the cooling module and the air outlet of the condenser is spaced apart from the outlet of the condenser enclosure. In previous embodiments, the air inlets 122 of the condenser were spaced apart from the air outlet of the cooling module and the air outlet of the condenser was abutted against the air outlet of the condenser enclosure. Such a configuration as in the previous embodiments is also contemplated by the present disclosure and may be achieved by changing to location of the condenser unit inside the upper chamber.

The all-in-one ECCU unit shown in FIGS. 11A and 11B lacks the dampers that permit operation with outside ambient air being directed to the condenser without first passing through the cooling module. It is contemplated to provide dampers on an all-in-one unit so that outside ambient air can be directed to the condenser unit through the dampers when they are in an open position and the cooling module is turned off or otherwise not operational, and so that evaporatively cooled air can be directed to the condenser unit when the cooling module is in operation and the dampers are in a closed position.

The humidity levels at the installation site effect the operation of the present device. Dryer climates provide a greater increase in efficiency. In more humid environments, lower efficiencies may still result in less energy savings with the present device.

Energy is saved by allowing the air conditioner system to operate in a cooler environment. Use of a small motor 11 and fan blade eliminates any increase in static pressure for the condenser unit. One, two, or more condenser units 3 may be supplied by a single cooling module 5. The wall panels 59 of the condenser enclosure are assembled to accommodate different condensers and condenser configurations. Use of the drift eliminator 25 reduces the problem of water carry over to the condenser coil 41 of the condenser unit 3. The barometric dampers 45 disposed in the wall panels 59 of the housing 43 of the condenser enclosure 7 provide a failsafe system that prevents damage to the air conditioner system in the event that the cooling module 5 fails to start. In a preferred embodiment, the cooling module 5 keeps the condenser inlet air at an efficient 72 to 75 degrees F.

Although other modifications and changes may be suggested by those skilled in the art, it is the intention of the inventors to embody within the patent warranted hereon all changes and modifications as reasonably and properly come within the scope of their contribution to the art.

What is claimed is:

1. An evaporative condenser cooling unit for evaporatively cooling the intake air delivered to inlet openings of an air conditioner condenser unit, comprising:
   a cooling module, including:
      an outer cover defining an airflow channel, an air inlet, and an air outlet,
      an evaporative media disposed within said outer cover and having an air inlet side and an air outlet side, wherein said air inlet side is disposed adjacent said air inlet of said outer cover and said air outlet side is directed into said airflow channel,
      a water distributor configured to deliver water to, and to wet, said evaporative media,
      a drift eliminator disposed within said outer cover and having an inlet side and an outlet side, said inlet side of said drift eliminator being in air communication with said air outlet side of said evaporative media,
      a motor-driven fan in air communication with said outlet side of said drift eliminator and said air outlet of said outer cover, said fan configured to draw ambient external air into said airflow channel, in order, through said wet evaporative media and said drift eliminator to respectively cool and dehumidify the air, said fan further configured to expel said cooled and dehumidified air out said outer cover air outlet; and
   a condenser enclosure connected to said cooling module, including:
      an outer housing defining a supply opening and an exhaust air opening, said supply opening connected to said cooling module's outer cover air outlet, wherein said outer housing is configured to substantially enclose a plurality of air inlets of an air conditioner condenser unit, and wherein said exhaust air opening is configured to expose an air outlet of said air conditioner condenser to the ambient external air; and
      one or more dampers disposed in a sidewall of said outer housing, wherein said dampers are selectively movable between a closed position and an open position, the dampers closing a space to contain the cooled and dehumidified air at the air inlets of the air conditioner condenser unit when the dampers are in the closed position.

2. The evaporative condenser cooling unit of claim 1, wherein said one or more dampers includes one or more barometric dampers disposed in a sidewall of said outer housing, wherein said barometric dampers are in the closed position in the presence of positive air pressure inside said condenser enclosure created by operation of said fan of said cooling module, and wherein said barometric dampers are in the open position when said fan of said cooling module is not operating and a condenser fan of the air conditioner condenser unit is operating to create a negative air pressure inside said condenser enclosure.

3. The evaporative condenser cooling unit of claim 2, wherein said barometric dampers are hinged louvers.

4. The evaporative condenser cooling unit of claim 1, wherein said cooling module further includes:
   a water sump disposed in said cooling module at a lower end thereof, wherein a lower end of both said evaporative media and said drift eliminator extend to said water sump;
   a pump for pumping water from said water sump to said water distributor;
   a float valve mounted to said water sump to control the flow of supply water into the water sump from a water supply.

5. The evaporative condenser cooling unit of claim 1, wherein said evaporative media is corrugated paper.

6. The evaporative condenser cooling unit of claim 1, wherein said drift eliminator is a block of non-absorbent material formed with air passageways disposed at one or more angles to the airflow direction, wherein air passing through the air passageways causes water droplets in the air to collect on the angled walls of the air passageways and be removed from the air passing therethrough.

7. The evaporative condenser cooling unit of claim 1, wherein said drift eliminator is a block of absorbent expanded paper material formed with air passageways disposed at one or more angles to the airflow direction, wherein air passing through the air passageways causes water droplets in the air to collect on the angled walls of the air passageways and be removed from the air passing therethrough.

8. The evaporative condenser cooling unit of claim 1, wherein said drift eliminator includes a plurality of airflow channels configured to force the air to change directions as it passes through said drift eliminator, forcing water droplets contained in the cooled moist air to deposit on a surface of the airflow channels and removing the water droplets from the air.

9. The evaporative condenser cooling unit of claim 1, wherein said housing of said condenser enclosure includes wall panels that are connectable to one another for customizing the size and configuration of the condenser enclosure.

10. An evaporative condenser cooling unit for evaporatively cooling the intake air delivered to inlet openings of an air conditioner condenser unit, comprising:
   an air conditioner condenser unit including:
      a condenser coil,
      one or more condenser coil air inlets in air communication with said condenser coil,
      one or more condenser exhaust air outlets in air communication with said condenser coil, and
      a motor-driven condenser fan configured to draw air through the one or more condenser coil air inlets, over the condenser coil, and out the condenser exhaust air outlets;
   a cooling module, including:
      an outer cover defining an airflow channel, an air inlet, and an air outlet,
      an evaporative media disposed within said outer cover and having an air inlet side and an air outlet side, wherein said air inlet side is disposed adjacent said air inlet of said outer cover and said air outlet side is directed into said airflow channel,
      a water distributor configured to deliver water to, and to wet, said evaporative media,
      a drift eliminator disposed within said outer cover and having an inlet side and an outlet side, said inlet side of said drift eliminator being in air communication with said air outlet side of said evaporative media, a motor-driven fan in air communication with said outlet side of said drift eliminator and said air outlet of said outer cover, said fan configured to draw ambient external air into said airflow channel, in order, through said wet evaporative media and said drift eliminator to respectively cool and dehumidify the air, said fan further configured to expel said cooled and dehumidified air out said outer cover air outlet; and a condenser enclosure connected to said cooling module, including:

an outer housing defining a supply opening and an exhaust air opening, said supply opening connected to said cooling module's outer cover air outlet, wherein said outer housing substantially encloses said one or more condenser coil air inlets, and wherein said exhaust air opening exposes said one or more condenser exhaust air outlets to the ambient external air; and one or more dampers disposed in a sidewall of said outer housing, wherein said one or more dampers are selectively movable between a closed position and an open position, the one or more dampers closing a space to contain the cooled and dehumidified air at the air inlets of the air conditioner condenser unit when the one or more dampers are in the closed position.

11. The evaporative condenser cooling unit of claim 9, said one or more dampers include one or more barometric dampers disposed in a sidewall of said outer housing, wherein said barometric dampers are in the closed position in the presence of positive air pressure inside said condenser enclosure created by operation of said fan of said cooling module, and wherein said barometric dampers are in the open position when said fan of said cooling module is not operating and a condenser fan of the air conditioner condenser unit is operating to create a negative air pressure inside said condenser enclosure.

12. The evaporative condenser cooling unit of claim 10, wherein said one or more dampers are hinged louvers.

13. The evaporative condenser cooling unit of claim 9, wherein said cooling module further includes:

a water sump disposed in said cooling module at a lower end thereof, wherein a lower end of both said evaporative media and said drift eliminator extend to said water sump;

a pump for pumping water from said water sump to said water distributor;

a float valve mounted to said water sump to control the flow of supply water into the water sump from a water supply.

14. The evaporative condenser cooling unit of claim 9, wherein said evaporative media is corrugated paper.

15. The evaporative condenser cooling unit of claim 9, wherein said drift eliminator is a block of non-absorbent material formed with air passageways disposed at one or more angles to the airflow direction, wherein air passing through the air passageways causes water droplets in the air to collect on the angled walls of the air passageways and be removed from the air passing therethrough.

16. The evaporative condenser cooling unit of claim 9, wherein said drift eliminator is a block of absorbent expanded paper material formed with air passageways disposed at one or more angles to the airflow direction, wherein air passing through the air passageways causes water droplets in the air to collect on the angled walls of the air passageways and be removed from the air passing therethrough.

17. The evaporative condenser cooling unit of claim 9, wherein said drift eliminator includes a plurality of airflow channels configured to force the air to change directions as it passes through said drift eliminator, forcing water droplets contained in the cooled moist air to deposit on a surface of the airflow channels and removing the water droplets from the air.

18. The evaporative condenser cooling unit of claim 9, wherein said housing of said condenser enclosure includes wall panels that are connectable to one another for customizing the size and configuration of the condenser enclosure.

19. A method of cooling external ambient air to be provided to an air conditioner condenser unit, said method comprising the steps of:

wetting an evaporative media;

drawing external ambient air through said wet evaporative media and into a cooling module, wherein said ambient air passing through said wet evaporative media evaporatively cools said air;

drawing said cooled air through a drift eliminator in said cooling module to remove moisture from said cooled air;

selectively closing a condenser enclosure that encloses an air conditioner condenser unit by closing at least one damper disposed in a wall of the condenser enclosure; and delivering said cooled air from said cooling module to a plurality of inlet openings of the air conditioner condenser unit, said inlet openings being enclosed within an interior space of the condenser enclosure, the inlet openings receiving the cooled air when the at least one damper is in a closed position;

wherein said steps of drawing air through both of said evaporative media and drift eliminator, and delivering said cooled air to said inlet openings, are performed by a motor driven fan disposed in said cooling module.

20. A method of operating an air conditioner system, comprising the steps of:

evaporatively cooling air using a cool air module for generating the evaporatively cooled air to be delivered to an air conditioner condenser unit when said air conditioner system is operating in a first operating state;

operating an air conditioner condenser unit that is operatively connected to said air conditioner system;

enclosing the air conditioner condenser unit in a condenser enclosure that includes a housing having one or more barometric dampers, said barometric dampers having a closed position to direct cooled air from the cool air module to the air conditioner condenser unit when said air conditioner system is in the first operating state, and an open position to allow external ambient air to be drawn into an interior space of said housing through said dampers and into the air conditioner condenser unit when said air conditioner system is in a second operating state, said housing of said condenser enclosure being in air communication with said cool air module and enclosing a plurality of inlet openings of said air conditioner condenser unit, wherein, in said first operating state, said cooling module generates evaporatively cooled air that is delivered to said interior space of said housing of said condenser enclosure and to said plurality of inlet openings of said air condenser and a condenser fan draws the cool air into the inlet openings of the air condenser, over the condenser coil, and out the air condenser air outlet, said delivered cool air creating a positive air pressure within said housing to permit the barometric dampers to remain in the closed position, and wherein, in said second operating state, said condenser fan is operating while said cooling module is not operating, said condenser fan creating a negative pressure within said housing sufficient to permit the dampers to open so that ambient external air is drawn into the interior of the housing of the condenser enclosure, into the inlet openings of the air condenser, over the condenser coil, and out the air condenser air outlet;

operating said air conditioner in either said first or said second state;

switching said air conditioner system from said first state to said second state, or from said second state to said first state, wherein said switching step is controlled by a temperature sensor coupled to a switch that switches from the first operating state to the second operating state when the air temperature of the cooled air drops below a predetermined temperature, and switches from the second operating state to the first operating state when the external air temperature rises above a predetermined temperature.

* * * * *